US012033099B2

(12) United States Patent
Bordia et al.

(10) Patent No.: US 12,033,099 B2
(45) Date of Patent: Jul. 9, 2024

(54) SYSTEM AND METHOD FOR ON-DEMAND LAUNCHING OF AN INTERFACE ON A COMPUTE CLUSTER

(71) Applicant: Microsoft Technology Licensing, LLC, Redmond, WA (US)

(72) Inventors: Akshat Bordia, Karnataka (IN); Manoj Kumar Vijayrajan, Karnataka (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 214 days.

(21) Appl. No.: 17/673,447

(22) Filed: Feb. 16, 2022

(65) Prior Publication Data
US 2023/0259842 A1 Aug. 17, 2023

(51) Int. Cl.
*G06Q 10/0631* (2023.01)
*G06F 9/451* (2018.01)

(52) U.S. Cl.
CPC ....... *G06Q 10/06313* (2013.01); *G06F 9/451* (2018.02)

(58) Field of Classification Search
CPC ............ G06F 2209/508; G06F 9/5083; G06F 9/4881; G06F 9/4843; G06F 16/21; G06F 2209/501; G06F 9/451; G06F 9/5005; G06Q 10/06313
See application file for complete search history.

(56) References Cited

U.S. PATENT DOCUMENTS

| 6,249,291 B1* | 6/2001 | Popp | H04L 67/5683 345/473 |
| 7,134,008 B2* | 11/2006 | Dutt | H04L 67/125 713/1 |
| 7,702,796 B2* | 4/2010 | Shen | H04L 67/14 709/227 |
| 7,865,959 B1* | 1/2011 | Lewis | G06F 21/6218 726/17 |
| 7,917,469 B2* | 3/2011 | Bernhard | G06F 11/08 707/610 |
| 7,937,493 B2* | 5/2011 | Colrain | G06F 9/5083 709/224 |

(Continued)

OTHER PUBLICATIONS

Toor, Slamn Zubair, Managing Applications and Data in Distributed Computing Infrastructure Uppsala University, 2012 (Year: 2012).*

(Continued)

*Primary Examiner* — Scott L Jarrett
(74) *Attorney, Agent, or Firm* — Weaver IP L.L.C.

(57) ABSTRACT

Systems, methods, and devices are described for on-demand launching of an interface on a compute cluster. The interface enables a user to interact with an application while the application is executing on the compute cluster. A job request associated with the application is received. Responsive to the job request, a determination is made if the interface has already been launched on the compute cluster responsive to an earlier-received job request. If the interface has not already been launched, launch instructions are transmitted to the compute cluster to cause the interface to be launched on the compute cluster. Job instructions are transmitted to the compute cluster to cause the application to be executed on the compute cluster.

20 Claims, 13 Drawing Sheets

(56) References Cited

U.S. PATENT DOCUMENTS

| | | | | |
|---|---|---|---|---|
| 7,953,860 | B2* | 5/2011 | Colrain | G06F 11/1443 709/227 |
| 8,626,890 | B2* | 1/2014 | Colrain | G06F 9/5083 709/201 |
| 9,058,214 | B2* | 6/2015 | Ragusa | H04L 67/02 |
| 9,430,280 | B1* | 8/2016 | Shih | G06F 9/5005 |
| 9,967,327 | B2* | 5/2018 | Moorthi | G06F 9/5061 |
| 10,129,172 | B1* | 11/2018 | Stafford | G06F 9/4881 |
| 10,261,836 | B2* | 4/2019 | Bansal | H04L 43/0876 |
| 10,540,201 | B2* | 1/2020 | Mitevski | H04L 67/1012 |
| 10,572,315 | B1* | 2/2020 | Lusk | G06F 9/541 |
| 10,594,684 | B2* | 3/2020 | Bansal | G06F 9/4881 |
| 10,860,378 | B2* | 12/2020 | Raja | G06F 9/5033 |
| 11,038,953 | B1* | 6/2021 | Nayak | H04L 45/70 |
| 11,258,786 | B2* | 2/2022 | Bansal | H04L 63/108 |
| 11,263,034 | B2* | 3/2022 | Wagner | G06F 9/45533 |
| 11,290,540 | B2* | 3/2022 | De Lavarene | H04L 67/141 |
| 11,748,161 | B1* | 9/2023 | Johnson | G06F 9/48 718/101 |
| 11,762,706 | B1* | 9/2023 | Jarvis | G06F 9/5072 718/104 |
| 2005/0038801 | A1* | 2/2005 | Colrain | G06F 16/21 |
| 2005/0256971 | A1* | 11/2005 | Colrain | G06F 9/5083 709/238 |
| 2005/0262183 | A1* | 11/2005 | Colrain | G06F 9/5083 709/200 |
| 2009/0006888 | A1* | 1/2009 | Bernhard | G06F 11/2028 714/6.12 |
| 2011/0055368 | A1* | 3/2011 | Colrain | G06F 9/505 709/223 |
| 2012/0226813 | A1* | 9/2012 | Ragusa | G06F 9/5027 709/227 |
| 2012/0249579 | A1* | 10/2012 | Matthews | G06F 3/0481 345/619 |
| 2013/0297668 | A1* | 11/2013 | McGrath | G06F 9/485 709/201 |
| 2014/0229221 | A1* | 8/2014 | Shih | G06Q 10/06312 705/7.23 |
| 2014/0258365 | A1* | 9/2014 | L'Heureux | H04L 63/1408 709/203 |
| 2017/0004015 | A1* | 1/2017 | Raja | G06F 9/5083 |
| 2017/0090980 | A1* | 3/2017 | Martin | G06F 9/5066 |
| 2017/0185448 | A1* | 6/2017 | Tao | H04L 67/63 |
| 2017/0357530 | A1* | 12/2017 | Shih | G06F 9/50 |
| 2018/0063143 | A1* | 3/2018 | Wilson | H04L 67/60 |
| 2018/0077138 | A1* | 3/2018 | Bansal | G06Q 20/325 |
| 2019/0034224 | A1* | 1/2019 | Mitevski | G06F 9/4843 |
| 2020/0272670 | A1* | 8/2020 | Vaishnavi | G06F 9/541 |
| 2021/0392054 | A1* | 12/2021 | David | G06K 7/10297 |
| 2023/0300083 | A1* | 9/2023 | Mordani | G06F 9/4451 717/171 |

OTHER PUBLICATIONS

Universal Connection Pool Developer's Guide Oracle, Jan. 2019 (Year: 2019).*

Cuma, Martin—Hands-on introduction to Open OnDemand the University of Utah, Sep. 20, 2021 (Year: 2021).*

OmDemand.org website OnDemand.org, Mar. 4, 2020, Retrieved from Archive.org Feb. 22, 2024 (Year: 2020).*

Hudak, Dave et al., Open OnDemand: A web-based client portal for HPC centers the Journal of Open Source Software, May 15, 2018 (Year: 2018).*

Hudak, David E. et al., OSC On Demand: A Web Platform Integrating Access to HPC Systems, Web, and VNC Applications XSEDE'13, ACM, Jul. 2013 (Year: 2013).*

Nicklas, et al., "Supporting distributed, interactive Jupyter and RStudio in a scheduled HPC environment with Spark using Open OnDemand", In Proceedings of the Practice and Experience on Advanced Research Computing, Jul. 22, 2018, pp. 1-8.

"International Search Report and Written Opinion Issued in PCT Application No. PCT/US22/050819", dated Mar. 2, 2023, 14 Pages.

"Apache Livy", Retrieved From: https://livy.incubator.apache.org/, Retrieved on: Dec. 31, 2021, 2 Pages.

"Job Scheduling", Retrieved From: https://spark.apache.org/docs/2.4.5/job-scheduling.html#dynamic-resource-allocation, Retrieved on: Dec. 31, 2021, 6 Pages.

"ResourceManager REST API's", Retrieved From: https://hadoop.apache.org/docs/r2.8.5/hadoop-yarn/hadoop-yarn-site/ResourceManagerRest.html, Sep. 10, 2018, 78 Pages.

"Rest API", Retrieved From: https://livy.incubator.apache.org/docs/latest/rest-api.html, Retrieved on: Dec. 31, 2021, 10 Pages.

"Web Application Proxy", Retrieved From: https://hadoop.apache.org/docs/current/hadoop-yarn/hadoop-yarn-site/WebApplicationProxy.html, Jun. 15, 2021, 2 Pages.

Howell, et al., "Apache Spark in Azure Synapse Analytics Core Concepts", Retrieved From: https://docs.microsoft.com/en-us/azure/synapse-analytics/spark/apache-spark-concepts#/examples, Jan. 4, 2022, 4 Pages.

Wang, Yiheng, "Support multi-active high availability in Livy", Retrieved From: https://issues.apache.org/jira/browse/LIVY-718, Nov. 28, 2019, 7 Pages.

"Spark Configuration", Retrieved From: https://spark.apache.org/docs/2.4.5/configuration.html#/dynamic-allocation, Retrieved on: Jan. 6, 2022, 18 Pages.

"Apache Flink: Stateful Computations Over Data Streams", Retrieved from: https://web.archive.org/web/20200428004042/https://flink.apache.org/, Apr. 28, 2020, 2 Pages.

"Apache Hadoop YARN", Retrieved from: https://hadoop.apache.org/docs/stable/hadoop-yarn/hadoop-yarn-site/YARN.html, Jul. 29, 2022, 2 Pages.

"Apache Hive", Retrieved from: https://web.archive.org/web/20230113042125/https://hive.apache.org/, Jan. 13, 2023, 6 Pages.

"Apache Livy", Retrieved from: https://web.archive.org/web/20221111143331/https://docs.aws.amazon.com/emr/latest/ReleaseGuide/emr-livy.html, Nov. 11, 2022, 3 Pages.

"Apache Spark™—Unified Engine for Large-scale Data Analytics", Retrieved from: https://web.archive.org/web/20221119121419/https://spark.apache.org/, Nov. 19, 2022, 9 Pages.

"Apache ZooKeeper", Retrieved from: https://web.archive.org/web/20221119123118/https://zookeeper.apache.org/, Nov. 19, 2022, 1 Page.

"Azure Blob Storage", Retrieved from: https://web.archive.org/web/20221225032609/https://azure.microsoft.com/en-in/products/storage/blobs/#overview, Dec. 25, 2022, 12 Pages.

"Azure Synapse Analytics", Retrieved from: https://web.archive.org/web/20221225041754/https://azure.microsoft.com/en-in/products/synapse-analytics/, Dec. 25, 2022, 19 Pages.

"Cloud Object Storage—Amazon S3", Retrieved from: https://web.archive.org/web/20221118005621/https://aws.amazon.com/s3/, Nov. 18, 2022, 6 Pages.

Colombo, et al., ".NET Interactive", Retrieved from: https://github.com/dotnet/interactive, Jan. 21, 2023, 4 Pages.

"Cluster Mode Overview", Retrieved from: https://web.archive.org/web/20221114184209/https://spark.apache.org/docs/latest/cluster-overview.html, Nov. 14, 2022, 2 Pages.

"Azure Data Lake Storage", Retrieved from: https://web.archive.org/web/20221225041756/https://azure.microsoft.com/en-in/products/storage/data-lake-storage/#overview, Dec. 25, 2022, 14 Pages.

"Data Sources", Retrieved from: https://web.archive.org/web/20221228144527/https://spark.apache.org/docs/latest/sql-data-sources.html, Dec. 28, 2022, 2 Pages.

"Event Hubs", Retrieved from: https://web.archive.org/web/20230102075437/https://azure.microsoft.com/en-us/products/event-hubs/#features, Jan. 2, 2023, 14 Pages.

"Hadoop Azure Data Lake Support", Retrieved from: https://hadoop.apache.org/docs/stable/hadoop-azure-datalake/index.html, Jul. 29, 2022, 7 Pages.

"Hadoop Azure Support: Azure Blob Storage", Retrieved from: https://hadoop.apache.org/docs/current/hadoop-azure/index.html, Jul. 29, 2022, 9 Pages.

"Hadoop: YARN Federation", Retrieved from: https://hadoop.apache.org/docs/r2.9.1/hadoop-yarn/hadoop-yarn-site/Federation.html#AMRMProxy, Apr. 16, 2018, 7 Pages.

(56) References Cited

OTHER PUBLICATIONS

"Hadoop-AWS Module: Integration with Amazon Web Services", Retrieved from: https://hadoop.apache.org/docs/stable/hadoop-aws/tools/hadoop-aws/index.html, Jul. 29, 2022, 30 Pages.

"Install the Azure Toolkit for IntelliJ", Retrieved from: https://learn.microsoft.com/pdf?url=https%3A%2F%2Flearn.microsoft.com%2Fen-us%2Fazure%2Fdeveloper%2Fjava%2Ftoolkit-for-intellij%2Ftoc.json, Sep. 1, 2022, 61 Pages.

"Interface ApplicationMasterProtocol", Retrieved from: https://web.archive.org/web/20220123050034/https://hadoop.apache.org/docs/stable/api/org/apache/hadoop/yarn/api/ApplicationMasterProtocol.html, Jan. 23, 2022, 2 Pages.

"Key Vault", Retrieved from: https://web.archive.org/web/20221129121031/https://azure.microsoft.com/en-gb/products/key-vault/, Nov. 29, 2022, 7 Pages.

"Messaging Services on Azure", Retrieved from: https://web.archive.org/web/20221008034513/https://azure.microsoft.com/en-us/solutions/messaging-services/#overview, Oct. 8, 2022, 14 Pages.

".NET for Apache Spark", Retrieved from: https://github.com/dotnet/spark, Jan. 6, 2023, 5 Pages.

".NET for Apache Spark—A Free, Open-Source, and Cross-Platform Big Data Analytics Framework", Retrieved from: https://web.archive.org/web/20221004001421/https://dotnet.microsoft.com/en-us/apps/data/spark, Oct. 4, 2022, 5 Pages.

"Presto: Fast and Reliable SQL Engine for Data Analytics and the Open Lakehouse", Retrieved from: https://web.archive.org/web/20230109060930/https://prestodb.io/, Jan. 9, 2023, 7 Pages.

"Running Spark on YARN", Retrieved from: https://web.archive.org/web/20221214160111/https://spark.apache.org/docs/latest/running-on-yarn.html, Dec. 14, 2022, 10 Pages.

"Hadoop: Writing YARN Applications", Retrieved from: https://hadoop.apache.org/docs/stable/hadoop-yarn/hadoop-yarn-site/WritingYarnApplications.html, Retrieved Date: Nov. 18, 2022, 11 Pages.

Andrews, et al., "Welcome to Azure Cosmos DB", Retrieved from: https://learn.microsoft.com/en-us/azure/cosmos-db/introduction, Dec. 6, 2022, 5 Pages.

Chan, et al., "Spark-Jobserver", Retrieved from: https://github.com/spark-jobserver/spark-jobserver, Sep. 23, 2021, 18 Pages.

Chaiken, et al., "SCOPE: Easy and Efficient Parallel Processing of Massive Data Sets", In Proceedings of the VLDB Endowment, vol. 1, Issue 2, Aug. 1, 2008, pp. 1265-1276.

Hindman, et al., "Mesos: A Platform for Fine-Grained Resource Sharing in the Data Center", In Proceedings of the 8th USENIX Symposium on Networked Systems Design and Implementation, Mar. 30, 2011, pp. 1-14.

Iyer, et al., "Use Apache Spark REST API to Submit Remote Jobs to an HDInsight Spark Cluster", Retrieved from: https://learn.microsoft.com/en-us/azure/hdinsight/spark/apache-spark-livy-rest-interface, Apr. 1, 2022, 8 Pages.

Jiang, et al., "Tutorial: Create Apache Spark Job Definition in Synapse Studio", Retrieved from: https://learn.microsoft.com/en-us/azure/synapse-analytics/spark/apache-spark-job-definitions, May 24, 2022, 16 Pages.

Jindal, et al., "Magpie: Python at Speed and Scale Using Cloud Backends", In Proceedings of the 11th Annual Conference on Innovative Data Systems Research, Jan. 10, 2021, 9 Pages.

Karanasos, et al., "Advancements in YARN Resource Manager", In Encyclopedia of Big Data Technologies, Feb. 10, 2018, pp. 1-9.

Lucznik, et al., "Quickstart: Create a Serverless Apache Spark Pool in Azure Synapse Analytics using Web Tools", Retrieved from: https://learn.microsoft.com/en-us/azure/synapse-analytics/quickstart-apache-spark-notebook, Feb. 18, 2022, 8 Pages.

Power, et al., "The Cosmos Big Data Platform at Microsoft: Over a Decade of Progress and a Decade to Look Forward", In Proceedings of the VLDB Endowment, vol. 14, Issue 12, Jul. 1, 2021, pp. 3148-3161.

Ramakrishnan, Raghu, "How Microsoft Drives Exabyte Analytics on the World's Largest YARN Cluster", Retrieved from: https://azure.microsoft.com/en-in/blog/how-microsoft-drives-exabyte-analytics-on-the-world-s-largest-yarn-cluster/, Aug. 9, 2018, 6 Pages.

Shen, et al., "Magnet: Push-based Shuffle Service for Large-scale Data Processing", In Proceedings of the VLDB Endowment, vol. 13, Issue 12, Aug. 1, 2020, pp. 3382-3395.

Vavilapalli, et al., "Apache Hadoop YARN: Yet Another Resource Negotiator", In Proceedings of 4th Annual Symposium on Cloud Computing, Oct. 1, 2013, 16 Pages.

Wang, et al., "Load-Balancing Performance of Consistent Hashing: Asymptotic Analysis of Random Node Join", In IEEE/ACM Transactions of Networking, vol. 15, Issue 4, Aug. 2007, pp. 892-905.

Zhang, et al., "Riffle: Optimized Shuffle Service for Large-scale Data Analytics", In Proceedings of the Thirteenth EuroSys Conference, Apr. 23, 2018, 15 Pages.

Zhou, et al., "SCOPE: Parallel Databases Meet MapReduce", In the VLDB Journal, vol. 21, Issue 5, Oct. 1, 2012, pp. 611-636.

* cited by examiner

SYSTEM AND METHOD FOR ON-DEMAND LAUNCHING OF AN INTERFACE ON A COMPUTE CLUSTER

BACKGROUND

In large data compute clusters multiple kinds of workloads may be running. These clusters run various kind of analytics workloads. Different workloads might require different kinds of services for interacting with a particular workload. Typical implementations use one or more dedicated machines outside of the cluster to execute such services to enable interaction with the cluster and orchestrate jobs. These dedicated machines require additional resources, management, and maintenance. Furthermore, recovery of a service may be difficult if the dedicated machine fails.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for on-demand launching of an interface on a compute cluster. The interface enables a user to interact with an application while the application is executing on the compute cluster. A job request associated with the application is received. Responsive to the job request, a determination is made if the interface has already been launched on the compute cluster responsive to an earlier-received job request. If the interface has not already been launched, launch instructions are transmitted to the compute cluster to cause the interface to be launched on the compute cluster. Job instructions are transmitted to the compute cluster to cause the application to be executed on the compute cluster.

Further features and advantages of the embodiments, as well as the structure and operation of various embodiments, are described in detail below with reference to the accompanying drawings. It is noted that the claimed subject matter is not limited to the specific examples described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
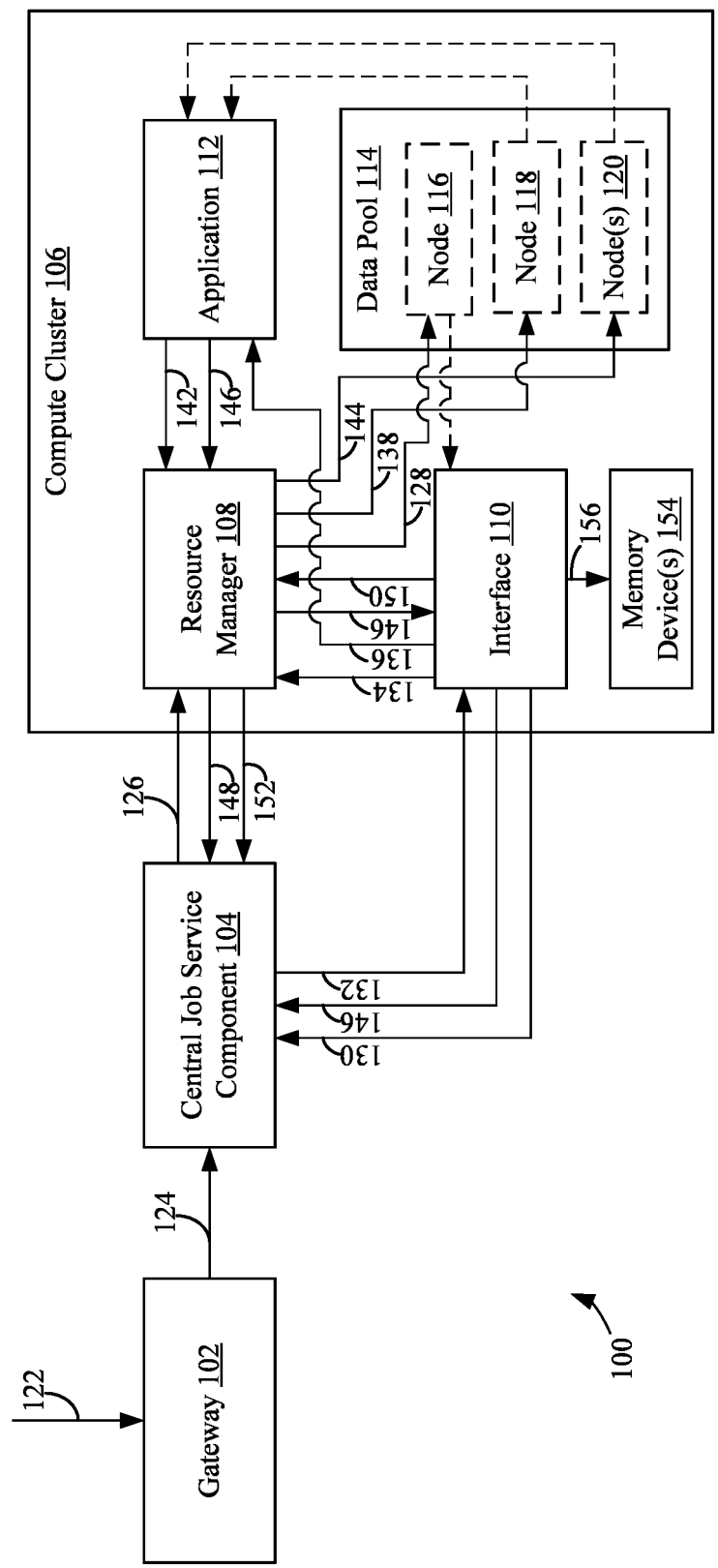
FIG. 1 is a block diagram of a system configured to on-demand launch an interface on a compute cluster, according to an example embodiment.

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

The example embodiments described herein are provided for illustrative purposes and are not limiting. The examples described herein may be adapted to any type of method or system for on-demand launching of an interface on a compute cluster. Further structural and operational embodiments, including modifications/alterations, will become apparent to persons skilled in the relevant art(s) from the teachings herein.

Numerous exemplary embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Central Job Service Component Embodiments

In large data compute clusters, multiple kinds of workloads may be running. These compute clusters may be multi-tenant and multi-workload data compute clusters. A compute cluster includes multiple nodes managed by a cluster service or a resource manager. Examples of a cluster service include Apache Hadoop® YARN, Apache Mesos®, Kubernetes®, etc. Each node of a compute cluster may be a physical machine (e.g., a server or other computing device), a virtual machine, and/or the like, depending on the particular implementation. A compute cluster may include any number of nodes including ones, tens, hundreds, thousands, millions, or even greater numbers of nodes. For instance, in a non-limiting example, a compute cluster includes 50,000 nodes. Furthermore, a compute cluster may include nodes of a single type (e.g., physical machines or virtual machines) or different types (e.g., physical machines and virtual machines). In embodiments, compute clusters may be divided into multi sub-clusters or grouped with other compute clusters. For instance, a system in accordance with an embodiment includes multiple federated compute clusters, each managed by the same cluster service. In an example embodiment, a compute cluster is divided into one or more workload queues. Each workload queue represents a fraction of the total capacity of resources of the compute cluster. For instance, a compute cluster may include five workload queues, each queue representing 20% of the compute cluster capacity.

Compute clusters may run various kinds of analytics workloads (e.g., Apache Spark™ software, Apache Flink® software, etc.). Different kinds of workload services may be used for interacting with a particular workload, depending on the particular implementation. Example workload services include Apache Livy, Spark Job Server, and/or the like. In accordance with an embodiment, a workload service is an interface used to interact with a compute cluster. The interface may comprise a representational state transfer (REST) application programming interface (API). The interface may be used to submit batch or interactive jobs, retrieve states of an application, determine job progress, stop a job, delete a job, and/or otherwise interact with a compute cluster and/or application executing on a compute cluster, as would be understood by a person of ordinary skill in the relevant art(s) having the benefit of this disclosure. For instance, in a non-limiting example, an interface may be used to execute an interactive notebook for data science on a compute cluster. In an illustrative example, an Apache Livy interface may be used to submit queries and/or instructions to an Apache Spark application running on a YARN cluster.

Embodiments of the present disclosure provide for on-demand launching of an interface associated with an application to be executed on a compute cluster. In accordance with an embodiment, an interface is launched as part of a compute cluster infrastructure. The compute cluster launches the interface as an application master using a resource manager. For instance, a compute cluster in accordance with an embodiment is a YARN cluster with a resource manager that launches a Livy instance as an interface application master on the YARN cluster. Once the interface is launched, jobs may be submitted to the interface for executing the associated application. In accordance with an embodiment of a system including multiple federated compute clusters, each compute cluster includes a respective resource manager. In this context, the system includes a router that routes submissions to a resource manager of a compute cluster.

A central job service component manages the lifecycle of an interface launched as part of a compute cluster infrastructure. In an embodiment, the central job service component comprises an integrated part of a system job service, while in an alternate embodiment, the central job service component comprises a plug-in to a system job service. The central job service component may facilitate the launching of interfaces and the submission of jobs to an interface. For instance, a central job service component in accordance with an embodiment may provide one or more of the following features.

On-Demand Interface Launching. In response to receiving a job request, embodiments determine if an interface associated with an application has already been launched on the compute cluster. If an interface associated with the application has not yet been launched, the central job service component transmits an on-demand instruction to launch the interface. If an interface associated with the application has already been launched, then the central job service component need not re-launch it.

Granular Flexibility. The determination as to whether an interface should be launched on-demand may be made at any level of granularity, such as per user, per customer account, or per workload queue. The central job service component may compare an identifier (e.g., a user ID, a customer ID, a workload queue ID, etc.) of a job request with identifiers associated with previously-launched interfaces on a compute cluster to determine if an instance of an interface is already running for the particular entity type (e.g., for a particular user, customer, or workload) and only launch the interface if no matching interface is found.

Flexible Scaling. Embodiments may launch additional interface instances as demand increases and selectively terminate interface instances as demand decreases. Furthermore, since interface instances are launched as part of a compute cluster infrastructure, the number of interface instances is not limited by infrastructure external to the compute cluster infrastructure (i.e., a dedicated device external to the compute cluster).

Overhead Reduction. Since the interface is executed on the compute cluster, there is no need to maintain servers external to the compute cluster to run the interface. Running the interface on external servers can be an expensive proposition, especially when there are a relatively small number of requests for a particular workload. Furthermore, if there is no traffic, the interface executing on the compute cluster may be auto-paused, thereby conserving resources.

Interface Recovery. In the event of an interface failure, an interface may be recovered. In some cases, the interface may be recovered without having to relaunch the associated application.

Application Clean Up. In accordance with an embodiment, if an interface fails or fails more than a predetermined number of times, the central job service component transmits terminate instructions for terminating any applications executing on the compute cluster associated with the failed interface.

Embodiments of central job service components leverage compute cluster infrastructure to provide a flexible on-demand launching of an interface associated with an application. The interface launched on the compute cluster enables a user to interact with the application while the application is executing on the compute cluster. For instance, a user may create a virtual data pool for executing an application. The virtual data pool includes a number of nodes. The virtual data pool's pool quota is the number of cores across the nodes of the virtual data pool. In accordance with an embodiment, each virtual data pool has an associated interface. Requests to submit jobs, submit further instructions to a job, retrieve states, determine job progress, stop a job, delete a job, submit interactive code statements, check status of a job, and/or otherwise interact with the virtual data pool are submitted to the associated interface. For instance, the interface receives a job request and schedules the job based on the available cores in the virtual data pool. If there is capacity to run a job, it is executed. If there is not capacity to run a job, the job may be queued or rejected, depending on the particular implementation. In accordance with an embodiment, the central job service component tracks the capacity for running jobs. Jobs may be tracked via logs, tokens, queries, and/or other tracking methods described herein or as would otherwise be understood by a person of skill in the relevant art(s) having benefit of this disclosure.

Central job service components may be configured in various ways. For instance, FIG. 1 is a block diagram of a system 100 configured to on-demand launch an interface on a compute cluster, according to an example embodiment. As shown in FIG. 1, system 100 includes a gateway 102, a central job service component 104, and a compute cluster 106 ("cluster 106" hereafter). Gateway 102 and central job service component 104 may be services implemented in one or more computing devices, servers, virtual machines, and/or or the like. In accordance with an embodiment, gateway 102 and central job service component 104 are implemented as a single service. Cluster 106 is a cluster of nodes managed by a cluster service. Cluster 106 may include any number of nodes including ones, tens, hundreds, thousands, millions, or even greater numbers of nodes. Furthermore, cluster 106 may include nodes of a single type (e.g., physical machines or virtual machines) or different types (e.g., physical machines and virtual machines). In some embodiments, cluster 106 may be divided into multiple sub-clusters. While FIG. 1 illustrates a single central job service component 104 that interacts with a single cluster 106, it is contemplated herein that multiple central job services and/or multiple clusters may be used, depending on the particular implementation. For instance, in accordance with an embodiment, cluster 106 is a federated cluster of multiple sub-clusters, where central job service component 104 interacts with each sub-cluster via a router and respective resource managers of each sub-cluster of cluster 106. In accordance with an embodiment, cluster 106 interacts with multiple central job service components, including central job service component 104.

As illustrated in FIG. 1, cluster 106 includes a resource manager 108, an interface 110, an application 112, a data pool 114, and one or more memory device(s) 154. Data pool 114 is a pool of nodes managed by the cluster service associated with cluster 106. As illustrated in FIG. 1, data pool 114 includes a node 116, anode 118, and one or more node(s) 120. It is contemplated herein that data pool 114 may include any number of nodes. Furthermore, cluster 106 may include multiple data pools. For instance, data pools may be grouped by a number of nodes, one or more type of nodes, and/or other factors, as would be understood by a person of skill in the relevant art(s) having the benefit of this disclosure. In accordance with an embodiment, one or more applications may be launched on nodes of a data pool. Resource manager 108, interface 110, and application 112 may be services implemented in one or more nodes of cluster 106. For instance, in accordance with an embodiment, resource manager 108 is implemented in a resource manager node, interface 110 is implemented in an interface node (e.g., node 116 of data pool 114), and application 112 is implemented in one or more nodes allocated for executing application 112 (e.g., node 118 and node(s) 120 of data pool 114).

Memory device(s) 154 include one or more volatile and/or non-volatile memory devices configured to store data corresponding to cluster 106. For instance, memory device(s) 154 may store a state of interface 110, a job log of interface 110, an application log of cluster 106, a state of application 112, results of an execution of application 112, and/or other data associated with the operation of cluster 106. As shown in FIG. 1, memory device(s) 154 may be internal to cluster 106, in embodiments, however, it is also contemplated herein that all of or a portion of memory device(s) 154 may be external to compute cluster 106. Furthermore, it is contemplated herein that all or a portion of memory device(s) 154 may be internal to a component of compute cluster 106, such as resource manager 108 and/or a node of data pool 114.

Gateway 102 is configured to receive a user input 122 from a user. In accordance with an embodiment, user input 122 includes a job request. Gateway 102 may analyze and/or otherwise process user input 122. For instance, gateway 102 may include an authentication service that determines whether or not the user is authorized to submit a job request to system 100. As illustrated in in FIG. 1, gateway 102 transmits a job request 124 to central job service component 104.

Central job service component 104 is configured to receive and process job request 124. For instance, central job service component 104 may determine if job request 124 is associated with an application, and if an interface associated with the application has already been launched on cluster 106. If an interface associated with the application has not been launched, central job service component 104 transmits launch instructions 126 to cluster 106 to cause an interface to be launched on cluster 106. For example, as illustrated in FIG. 1, if central job service component 104 determines an interface associated with the application associated with job request 124 has not been launched on cluster 106, central job service component transmits launch instructions 126 to resource manager 108 of cluster 106. In accordance with an embodiment, launch instructions 126 includes job instructions. If an interface associated with the application has been launched, central job service component 104 transmits job instructions 132 to cluster 106 to cause the application to be executed on cluster 106. For example, as illustrated in FIG. 1, interface 110 has been launched on cluster 106 and is associated with application 112. If central job service component 104 determines job request 124 is associated with application 112, central job service component 104 transmits job instructions 132 to interface 110 to cause application 112 to be executed on cluster 106. In accordance with an embodiment, central job service component 104 receives an endpoint value 130 from interface 110 and transmits job instructions 132 to interface 110 using endpoint value 130.

Resource manager 108 is configured to launch interfaces, launch applications, and allocate nodes of cluster 106. For instance, resource manager 108 receives launch instructions 126 from central job service component 104 and launches an interface on a node of cluster 106. For example, as illustrated in FIG. 1, resource manager 108 receives launch instructions 126 and allocates node 116 of data pool 114 to interface 110 by launching interface 110 on node 116 via launch signal 128. In accordance with an embodiment, launch signal 128 includes job instructions 132 associated with job request 124. In this scenario, interface 110 is configured to process job instructions 132 after launching on node 116. In accordance with another embodiment, interface 110 receives job instructions 132 subsequent to launching on node 116.

Interface 110 is configured to receive and process job instructions associated with an application managed by interface 110. For instance, interface 110 is configured to receive job instructions 132, determine application 112 is associated with job instructions 132, and determine if application 112 has been launched on cluster 106. If application 112 has not been launched, interface 110 transmits application launch instructions 134 to resource manager 108 to cause resource manager 108 to launch application 112. If application 112 has been launched, interface 110 transmits application job instructions 136 to application 112 to cause application 112 to perform a job of job instructions 136.

As stated above, resource manager 108 is further configured to launch an application on cluster 106. For instance, as illustrated in FIG. 1, resource manager 108 receives application launch instructions 134 and allocates node 118 of data pool 114 to application 112 by launching application 112 on node 118 via launch signal 138. In accordance with an embodiment, application launch instructions 134 and launch signal 138 include application job instructions 136. In this scenario, application 112 is configured to perform a job of application job instructions 136 after launching on node 118. In accordance with another embodiment, application 112 receives application job instructions 136 from interface 110 to cause application 112 to perform the job of application job instructions 136 on cluster 106 subsequent to launching on node 116. Application 112 is configured to generate a resource request 142 to allocate at least one node for performing a job associated with application job instructions 136. Responsive to resource request 142, resource manager 108 allocates one or more node(s) 120 of data pool 114 via allocate signal 144. Application 112 may generate resource request 142 as part of or subsequent to launching on node 118, in embodiments.

Central job service component 104 is configured to query cluster 106 for information such as job progress, interface state, and/or other information associated with operation of interface 110 and/or execution of application 112, as described elsewhere herein. For example, central job service component 104 in accordance with an embodiment queries interface 110 for job progress and/or application status. In embodiments, the query may be part of job instructions 132 or a separate query request. In accordance with an embodiment, central job service component 104 periodically queries interface 110 for job progress and/or application status.

Interface 110 may determine job progress and/or application status in various ways. For instance, in accordance with an embodiment, application 112 generates an application state signal 146 indicative of a state of application 112. Application state signal 146 may indicate job progress, job completion, failure in performing a job or task associated with the job, resources used by application 112, and/or other information associated with the execution of application 112 on cluster 106, as described elsewhere herein. Application 112 may generate application state signal 146 periodically, in response to a query from resource manager 108, in response to a query from interface 110, in response to a failure of a job, in response to completion of a job, and/or the like. Resource manager 108 is configured to receive application state signal 146 from application 112. In embodiments, resource manager 108 transmits application state signal 146 to interface 110 in response to a query from interface 110, which may be periodic and/or responsive to a query from central job service component 104. Interface 110 transmits application state signal 146 to central job service component 104 in response to a query from central job service component 104, as described above.

In embodiments, central job service component 104 may query resource manager 108 for a state of interface 110 and/or other information associated with interface 110. Responsive to the query, resource manager 108 is configured to generate an interface state signal 148 and transmit interface state signal 148 to central job service component 104. Interface state signal 148 may include information corresponding to a state of interface 110, a job log associated with interface 110, and/or other information associated with the operation of interface 110. In embodiments, central job service component 104 may query resource manager 108 for interface state signal 148 periodically or in response to an input from a user (e.g., user input 122 and/or job request 124). In accordance with an embodiment, resource manager 108 generates interface state signal 148 based on a heartbeat signal 150, as described with respect to FIG. 5 below.

In embodiments, system 100 may be configured to monitor the state of an interface. For instance, as illustrated in FIG. 1, interface 110 periodically generates a heartbeat signal 150. Resource manager 108 receives heartbeat signal 150 and determines if interface 110 is operating regularly. If heartbeat signal 150 is irregular or interface 110 does not transmit heartbeat signal 150 within a predetermined time, resource manager 108 determines interface 110 has failed. Depending on the implementation, resource manager 108 may attempt to relaunch interface 110 or generate an error signal 152 indicative of the failure of interface 110. In accordance with an embodiment, resource manager 108 generates error signal 152 after interface 110 has failed more than a predetermined number of times. In this context, central job service component 104 generates terminate instructions for terminating application 112 in response to error signal 152. While interface 110 is illustrated in FIG. 1 as transmitting heartbeat signal 150 to resource manager 108, it is contemplated herein that interface 110 may transmit heartbeat signal 150 to central job service component 104, in embodiments.

System 100 may include additional components and/or subcomponents, not shown in FIG. 1 for brevity and illustrative clarity. For example, system 100 may include multiple central job service components that operate in a similar manner to central job service component 104, each associated with a respective compute cluster or sub-cluster. In this context, each central job service component is configured to launch an interface on demand on a respective compute cluster. In some embodiments, cluster 106 may include one or more additional data pools, virtual data pools, additional applications, additional resource managers, additional interfaces, and/or the like.

Figure 2:
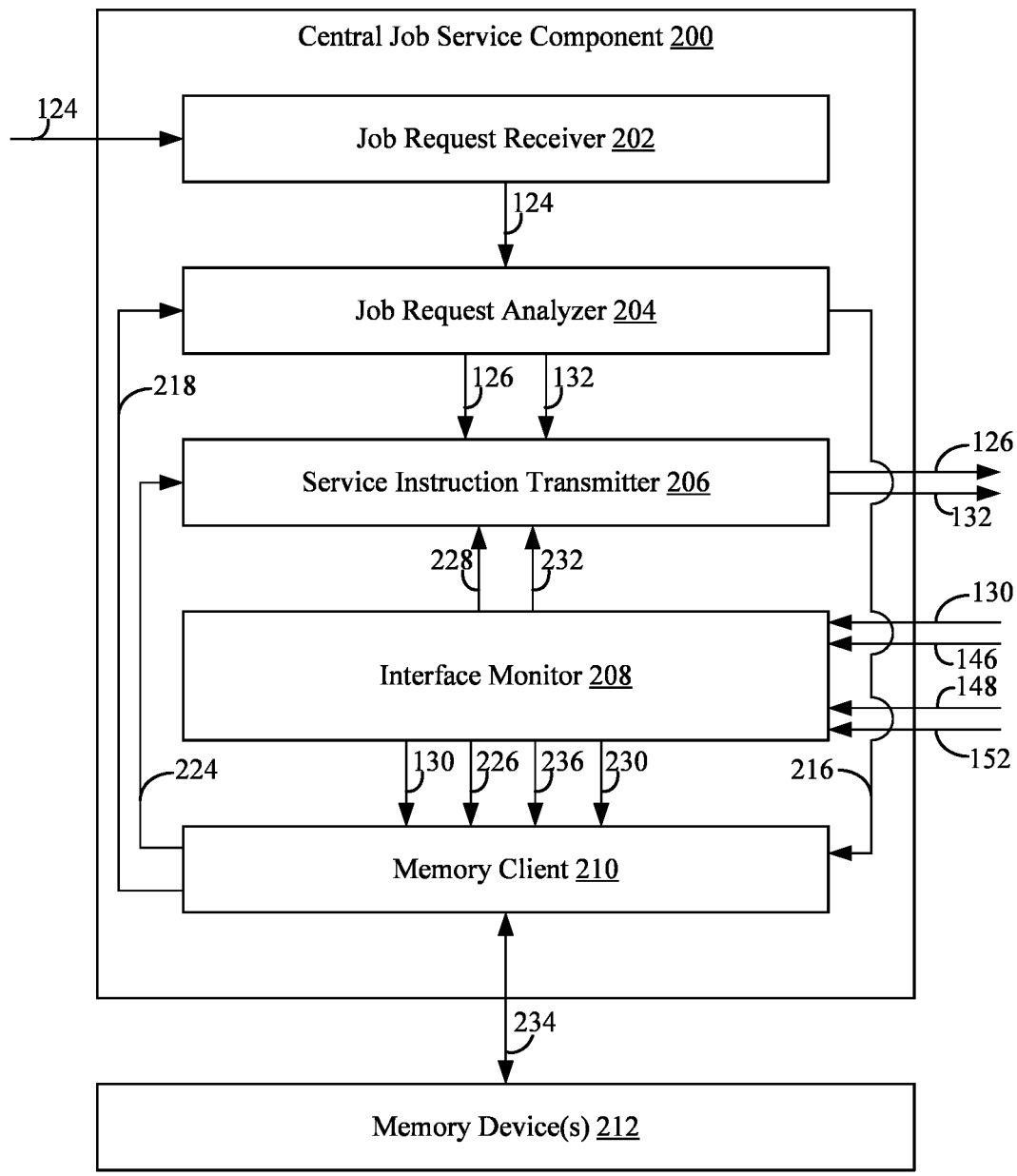
FIG. 2 is a block diagram of a central job service component configured to transmit instructions for on-demand launching of an interface on a compute cluster, according to an example embodiment.

Central job service components may be configured in various ways. For instance, FIG. 2 is a block diagram of a central job service component 200 configured to transmit instructions for on-demand launching of an interface on a compute cluster, according to an example embodiment. Central job service component 200 is a further embodiment of central job service component 104 of FIG. 1, and is described as follows with respect to system 100 of FIG. 1. Further structural and operational embodiments will be apparent to persons skilled in the relevant art(s) based on the following description.

Central job service component 200 may be implemented in one or more computing devices, and, as shown in FIG. 2, includes a job request receiver 202, a job request analyzer 204, a service instruction transmitter 206, an interface monitor 208, and a memory client 210. Central job service component 200 may be configured to interface with one or more memory device(s) 212, in embodiments. Memory device(s) 212 may include one or more volatile memory devices (e.g., double data rate memory devices, synchronous random-access memory devices, dynamic random-access memory devices, etc.) and/or non-volatile memory devices (e.g., hard drives, flash memory devices, non-volatile random-access memory devices, etc.). As shown in FIG. 2, memory device(s) 212 may be external to central job service component 200, in embodiments, however, it is also contemplated herein that all of or a portion of memory device(s) 212 may be internal to central job service component 200. The components of central job service component 200 shown in FIG. 2 are described in further detail as follows.

Memory client 210 is configured to store data associated with central job service component 200 in memory device(s) 212. Memory client 210 may store data such as endpoint values of associated interfaces, state stores of associated interfaces, application states, job progress, logs, and/or other information associated with interfaces managed by central job service component 200, as described elsewhere herein. As illustrated in FIG. 2, memory client 210 is communicatively coupled to memory device(s) 212 via communication link 234. Communication link 234 may comprise one or more physical (e.g., wires, conductive traces, etc.) and/or wireless (e.g., radio frequency, infrared, etc.) communication connections, or any combination thereof.

Job request receiver 202 may include any type or number of wired and/or wireless communication or network adapters, modems, etc., configured to receive job requests from a gateway, such as gateway 102 of FIG. 1. For instance, job request receiver 202 receives job request 124 and transmits it to components of central job service component 200. In accordance with an embodiment, gateway 102 of FIG. 1 is integrated with central job service component 200. In this context, job request receiver 202 may be integrated with gateway 102. For instance, an integrated job request receiver 202 and gateway 102 may receive user input 122 and generate job request 124 for processing by other components of central job service component 200.

Job request analyzer 204 is configured to analyze job requests received by job request receiver 202. For instance, job request analyzer 204 receives and analyzes job request 124. As part of this analysis, job request analyzer 204 determines an application associated with job request 124 (e.g., application 112 of FIG. 1). Job request analyzer 204 determines if an interface associated with the application (e.g., interface 110) has already been launched on cluster 106 of FIG. 1. For instance, as illustrated in FIG. 2, job request analyzer 204 transmits a query 216 to memory client 210 to determine if interface 110 has already been launched on cluster 106 in accordance with an earlier-received job request. Job request analyzer 204 receives a response 218 indicative of whether or not an interface has already been launched. If an interface has not already been launched, job request analyzer 204 generates launch instructions 126. If an interface has been launched, job request analyzer 204 generates job instructions 132. In accordance with an embodiment, launch instructions 126 include job instructions 132.

Service instruction transmitter 206 is configured to transmit instructions to a compute cluster for launching of an interface and/or executing an application on the compute cluster. For instance, service instruction transmitter 206 is configured to receive launch instructions 126 and/or job instructions 132 from job request analyzer 204 and transmits them to cluster 106 of FIG. 1. Service instruction transmitter 206 may be configured to determine an endpoint value of interface 110 in order to transmit job instructions 132 to interface 110. For example, as illustrated in FIG. 2, service instruction transmitter 206 receives a stored endpoint value 224 from memory client 210 and utilizes stored endpoint value 224 to transmit job instructions 132 to interface 110.

Interface monitor 208 is configured to receive and process signals associated with interfaces launched on a compute cluster. For example, interface monitor 208 receives endpoint value 130, application state signal 146, interface state signal 148, and error signal 152 from cluster 106 of FIG. 1. Endpoint value 130 indicates an endpoint of interface 110. Interface monitor 208 transmits endpoint value 130 to memory client 210 for storage in memory device(s) 212. In a non-limiting example, endpoint value 130 is a base64 encoded value with a session identifier (ID) as a key. The endpoint value may be an internet protocol (IP) address, a uniform resource locator (URL), a port ID, or another form of identification suitable for identifying the endpoint of interface 110, as would be understood by a person of skill in the relevant art(s) having benefit of this disclosure.

Interface monitor 208 is further configured to monitor operation of interfaces and applications launched on a compute cluster. For instance, as stated above, interface monitor 208 receives application state signal 146 from interface 110 indicative of the state of application 112, interface state signal 148 from resource manager 108 indicative of the state of interface 110, and error signal 152 from resource manager 108 indicative of an error or failure of interface 110. With respect to application state signal 146 and interface state signal 148, interface monitor 208 processes the state signals and generates application state information 226 and/or interface state information 236, respectively. Memory client 210 stores application state information 226 and interface state information 236 in memory device(s) 212. In accordance with an embodiment, interface state information 236 is a state store of interface 110. Furthermore, interface monitor 208 may generate a response 228 based on one or more of application state signal 146 and/or interface state signal 148. For example, interface monitor 208 may generate response 228 to terminate interface 110 and/or application 112, launch an additional interface, and/or otherwise interact with compute cluster 106, as described elsewhere herein. With respect to error signal 152, interface monitor 208 may process error signal 152 in various ways. For instance, as shown in FIG. 2, interface monitor 208 generates failure information 230 and terminate instructions 232 in response to error signal 152. Failure information 230 may include various information associated with failed interface 110, such as, an endpoint value of interface 110, an application ID of interface 110, a timestamp of the failure, allocated resources, associated applications, a number of times interface 110 failed, and/or other information associated with failed interface 110, as described elsewhere herein.

Figure 3A:
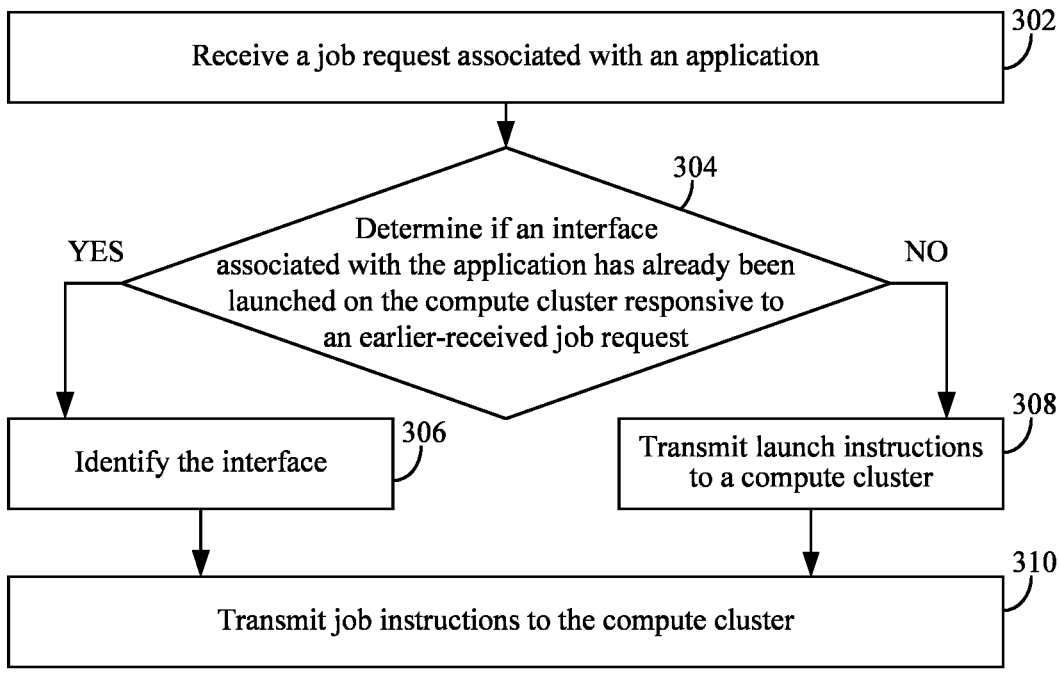
FIG. 3A is a flowchart of a process for on-demand launching of an interface on a compute cluster, according to an example embodiment.

Note that central job service component 200 as illustrated in FIG. 2 may operate in various ways, in embodiments. For instance, FIG. 3A is a flowchart 300 of a process for on-demand launching of an interface on a compute cluster, according to an example embodiment. In an embodiment, central job service component 200 may be configured to perform one or all of the steps of flowchart 300. Flowchart 300 is described as follows with respect to system 100 of FIG. 1 and central job service component 200 of FIG. 2. Further structural and operational embodiments will be apparent to persons skilled in the relevant art(s) based on the following description. Note that not all steps of flowchart 300 need to be performed in all embodiments.

Flowchart 300 begins with step 302. In step 302, a job request associated with an application is received. For instance, job request receiver 202 of FIG. 2 receives a job request 124 associated with application 112 of FIG. 1. Job request 124 may be received from a gateway, such as gateway 102. Job request 124 may be a request to execute an application, perform a job, retrieve a state of interface 110 and/or application 112, retrieve progress of a job performed by application 112, terminate application 112, and/or perform other functions associated with cluster 106, as described elsewhere herein or as would be understood by a person of skill in the relevant art(s) having the benefit of this disclosure. Job request 124 may include information such as a user ID, a customer ID, a session ID, job information, and/or other information associated with the user, the job, and/or compute cluster 106. Job information may include one or more of executable files (e.g., .exe files, .class files), compressed files (e.g., .jar files, a .zip files), stack files (e.g., .net files), other program files, snippets of code (e.g., Python® code, Java® code, Scala code, etc.), and/or other forms of code for causing cluster 106 to perform a job associated with the job request. For instance, job information may include a code statement. Interface 110 may determine a job to be performed by the application based on the code statement. For instance, the code statement may be an API call to interface 110 to cause application 112 to perform a job.

In step 304, a determination if an interface associated with the application has already been launched on the compute cluster responsive to an earlier-received job request is made.

For instance, job request analyzer 204 of FIG. 2 is configured to determine if interface 110 of FIG. 1 has already been launched on cluster 106 responsive to an earlier-received job request. Job request analyzer 204 may determine if interface 110 has been launched in various ways. For example, job request analyzer 204 may query memory client 210 (e.g., via query 216) and/or cluster 106. If interface 110 has already been launched, job request analyzer 204 generates job instructions 132 and flowchart 300 proceeds to step 306. If interface 110 has not already been launched, job request analyzer 204 generates launch instructions 126 and flowchart 300 proceeds to step 308. In embodiments, job request analyzer 204 may determine if interface 110 has already been launched based on various criteria, such as a user ID associated with job request 124, a customer ID associated with job request 124, and/or a workload queue ID associated with job request 124.

In step 306, the interface is identified. For instance, if interface 110 of FIG. 1 has already been launched on compute cluster 106, service instruction transmitter 206 of FIG. 2 is configured to identify interface 110. In accordance with an embodiment, interface 110 is identified via stored endpoint value 224.

In step 308, launch instructions are transmitted to a compute cluster. For instance, if interface 110 of FIG. 1 has not already been launched on compute cluster 106, service instruction transmitter 206 of FIG. 2 is configured to transmit launch instructions 126 to cluster 106 of FIG. 1 to cause interface 110 to be launched on cluster 106. In accordance with an embodiment, interface 110 is launched as an application of cluster 106, such as an application master.

In step 310, job instructions are transmitted to the compute cluster. For instance, service instruction transmitter 206 of FIG. 2 is configured to transmit job instructions 132 to cluster 106 of FIG. 1 to cause application 112 to be executed on cluster 106. For example, service instruction transmitter 206 may transmit job instructions 132 to interface 110 to cause application 112 to be executed on cluster 106.

Flowchart 300 has been described herein with steps 308 and 310 as separate steps; however, it is contemplated herein that launch instructions 126 and job instructions 132 may be transmitted simultaneously. For instance, in accordance with an embodiment, job request analyzer 204 of FIG. 2 determines interface 110 of FIG. 1 has not already been launched on cluster 106 and generates launch instructions 126 including job instructions 132. Service instruction transmitter 206 transmits launch instructions 126 including job instructions 132 to resource manager 108 to cause resource manager 108 to launch interface 110 on cluster 106. In this example, interface 110, subsequent to launching on compute cluster 106, processes job instructions 132 that were included with launch instructions 126 to cause application 112 to execute on cluster 106.

Figure 3B:
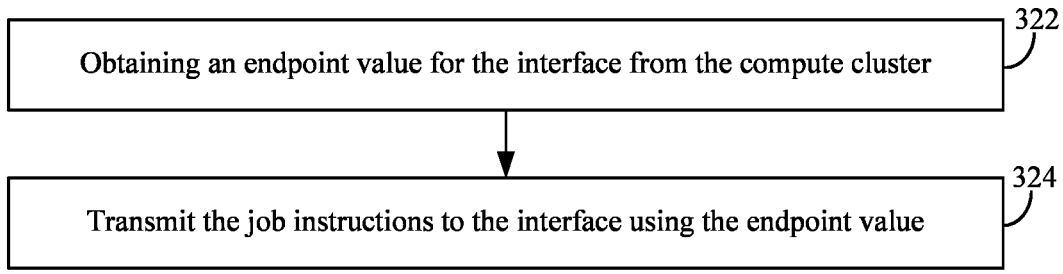
FIG. 3B is a flowchart of a process for transmitting instructions to a compute cluster, according to an example embodiment.

Note that step 310 may be performed in various ways. For instance, FIG. 3B is a flowchart 320 of a process for transmitting job instructions to the compute cluster, according to an example embodiment. In an embodiment, flowchart 320 is an example process for step 310 of flowchart 300 of FIG. 3A, and central job service component 200 of FIG. 2 may be configured to perform one or all of the steps of flowchart 320. Flowchart 320 is described as follows with respect to system 100 of FIG. 1 and central job service component 200 of FIG. 2. Further structural and operational embodiments will be apparent to persons skilled in the relevant art(s) based on the following description. Note that not all steps of flowchart 320 need to be performed in all embodiments.

Flowchart 320 begins with step 322, which may be performed subsequent to step 308 of flowchart 300. In step 322, an endpoint value for the interface is obtained from the compute cluster. For example, interface monitor 208 of FIG. 2 obtains endpoint value 130 for interface 110 from cluster 106 of FIG. 1. In embodiments, endpoint value 130 is received subsequent to interface 110 launching on cluster 110. In accordance with an embodiment, endpoint value 130 is obtained via communication between a memory client of interface 110 and interface monitor 208. Endpoint value 130 may be stored in memory device(s) 212 for use in performing later transmissions to interface 110, in embodiments. In accordance with an embodiment, central job service component 200 transmits endpoint value 130 to a user (e.g., via gateway 102). In this context, a user may include endpoint value 130 in subsequent user inputs to identify interface 110. In accordance with an embodiment, central job service component 200 transmits a proxy URL including a global unique identifier (GUID) corresponding to endpoint value 130 to a user (e.g., via gateway 102). In this context, the user may use the proxy URL in subsequent user inputs. Central job service component 200 translates the proxy URL to endpoint value 130 to communicate with interface 110.

Step 324 may be a subset of steps 306 and/or 310 of flowchart 300. In step 324, the job instructions are transmitted to the interface using the endpoint value. For instance, service instruction transmitter 206 of FIG. 2 receives stored endpoint value 224 to identify interface 110 of FIG. 1. Service instruction transmitter 206 transmits job instructions 132 to interface 110 using stored endpoint value 224. In accordance with an embodiment, job request 124 includes an endpoint value for communicating with interface 110.

Figure 4:
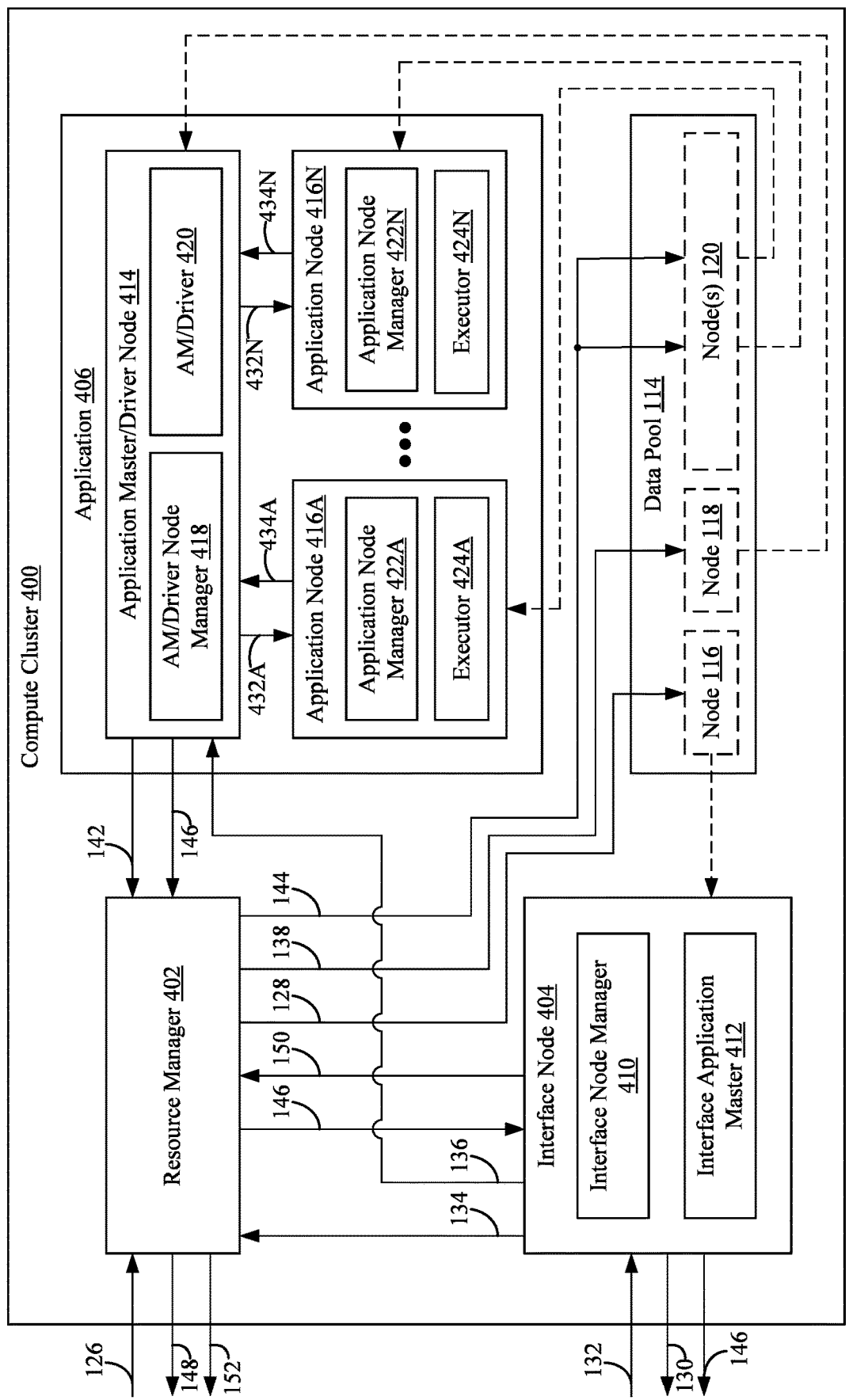
FIG. 4 is a block diagram of a compute cluster, according to an example embodiment.

Compute clusters may be configured in various ways, in embodiments. For instance, FIG. 4 is a block diagram of a compute cluster 400 ("cluster 400" hereafter), according to an example embodiment. Cluster 400 is a further embodiment of cluster 106 of FIG. 1, and is described as follows with respect to system 100 of FIG. 1. Further structural and operational embodiments will be apparent to persons skilled in the relevant art(s) based on the following description.

As illustrated in FIG. 4, cluster 400 includes a resource manager 402, an interface node 404, an application 406, and data pool 114 of FIG. 1. Resource manager 402 is a further embodiment of resource manager 108 of FIG. 1 and is configured to launch interfaces, launch applications, and allocate nodes of cluster 400. In this way, resource manager 402 manages resources to execute applications on cluster 400. For instance, 402 receives launch instructions 126 from central job service component 104 of FIG. 1 and allocates node 116 of data pool 114 as interface node 404 by launching interface application master 412 on node 116 via launch signal 128.

Interface node 404 includes an interface node manager 410 ("node manager 410" hereafter) and an interface application master 412. Node manager 410 is a service implemented on interface node 404 configured to manage operation of interface node 404. For instance, node manager 410 manages the launching of interface application master 412, termination of interface application master 412, memory of interface node 404, and other operations associated with interface node 404, as described elsewhere herein.

Interface application master 412 is a further embodiment of interface 110 of FIG. 1. Interface application master 412 is a service implemented on interface node 404. As illustrated in FIG. 4, interface application master 412 generates an endpoint value 130 subsequent to launching on interface node 404 and transmits endpoint value 130 to central job service component 104 of FIG. 1. As described above with respect to central job service component 200 of FIG. 2, central job service component uses endpoint value 130 to communicate with interface 412. For instance, interface application master 412 receives job instructions 132 associated with application 406 and determines if application 406 is executing on cluster 400. If application 406 is not executing on cluster 400, interface application master 412 generates application launch instructions 134 to cause resource manager 402 to allocate node 118 as application master and driver node 414 by launching application master and driver 420 ("driver 420" hereafter) on node 118 via launch signal 138. If application 406 is executing on cluster 400, interface application master 412 generates application job instructions 136 to cause application 406 to perform the job of application job instructions 136. Interface application master 412 transmits a heartbeat signal 150 to resource manager 402 indicative of the operating status of interface application master 412.

Application master and driver node 414 is configured to execute application 406 on cluster 400. Application master and driver node 414 includes application master and driver node manager 418 ("node manager 418" hereafter) and driver 420. Node manager 418 is a service implemented on application master and driver node 414 configured to manage operation of application master and driver node 414. For instance, node manager 418 manages the launching of driver 420, termination of driver 420, memory of application master and driver node 414, and other operations associated with application master and driver node 404, as described elsewhere herein.

Driver 420 is a service implemented on application master and driver node 414 and is configured to convert application job instructions into tasks and schedule tasks to be executed. Driver 420 receives application job signal 136 corresponding to a job to be performed by application 406, determines tasks associated with the job, and transmits a resource request 142 to resource manager 402 to cause resource manager 402 to allocate nodes of data pool 114 to perform the determined tasks. For instance, as shown in FIG. 4, resource manager 402 allocates node(s) 120 as application nodes 416A-416N via allocate signal 144. Driver 420 transmits task instructions 432A-432N to respective application nodes 416A-416N.

Application nodes 416A-416N each include respective application node managers 422A-422N ("node managers 422A-422N" hereafter) and respective executors 424A-424N. Node managers 422A-422N are services implemented on respective application nodes 416A-416N configured to manage operation of application nodes 416A-416N. Executors 424A-424N are worker nodes configured to perform tasks assigned by driver 420. If an executor fails, driver 420 may assign the task previously assigned to the failed executor to a new executor of executors 424A-424N. Furthermore, while each of executors 424A-424N are implemented in respective application nodes 416A-416N in FIG. 4, it is contemplated herein that multiple executors may be implemented on a single application node, in embodiments.

As stated above, driver 420 and executors 424A-424N are configured to perform jobs submitted to application 406. Each executor sends respective results 434A-434N to driver 420 indicative of the completion of a respective task. In accordance with an embodiment, driver 420 queries each executor for respective results 434A-434N. Driver 420 generates application state signal 146, which is received by resource manager 402. Interface 404 may query resource manager 402 for application state signal 146, as described with respect to application 112, resource manager 108, and interface 110 of FIG. 1 above. It is contemplated herein that application state signal 146 may be generated in response to job instructions 132, periodically (e.g., to indicate progress of a job performed by application 406), and/or in other ways, as described elsewhere herein or as would be understood by a person of skill in the relevant art(s) having benefit of this disclosure.

Cluster 400 of FIG. 4 may include additional components, not shown in FIG. 4 for brevity and illustrative clarity. For instance, cluster 400 may include one or more memory devices, such as memory device(s) 154 of FIG. 1, for storing information related to the operation of cluster 400. Furthermore, cluster 400 may include multiple resource managers, interfaces, applications, data pools, and associated nodes, depending on the particular implementation. For example, cluster 400 in accordance with an embodiment includes sub-clusters with respective resource managers. In this context, cluster 400 includes a router for managing submissions to each respective resource manager.

Figure 5:
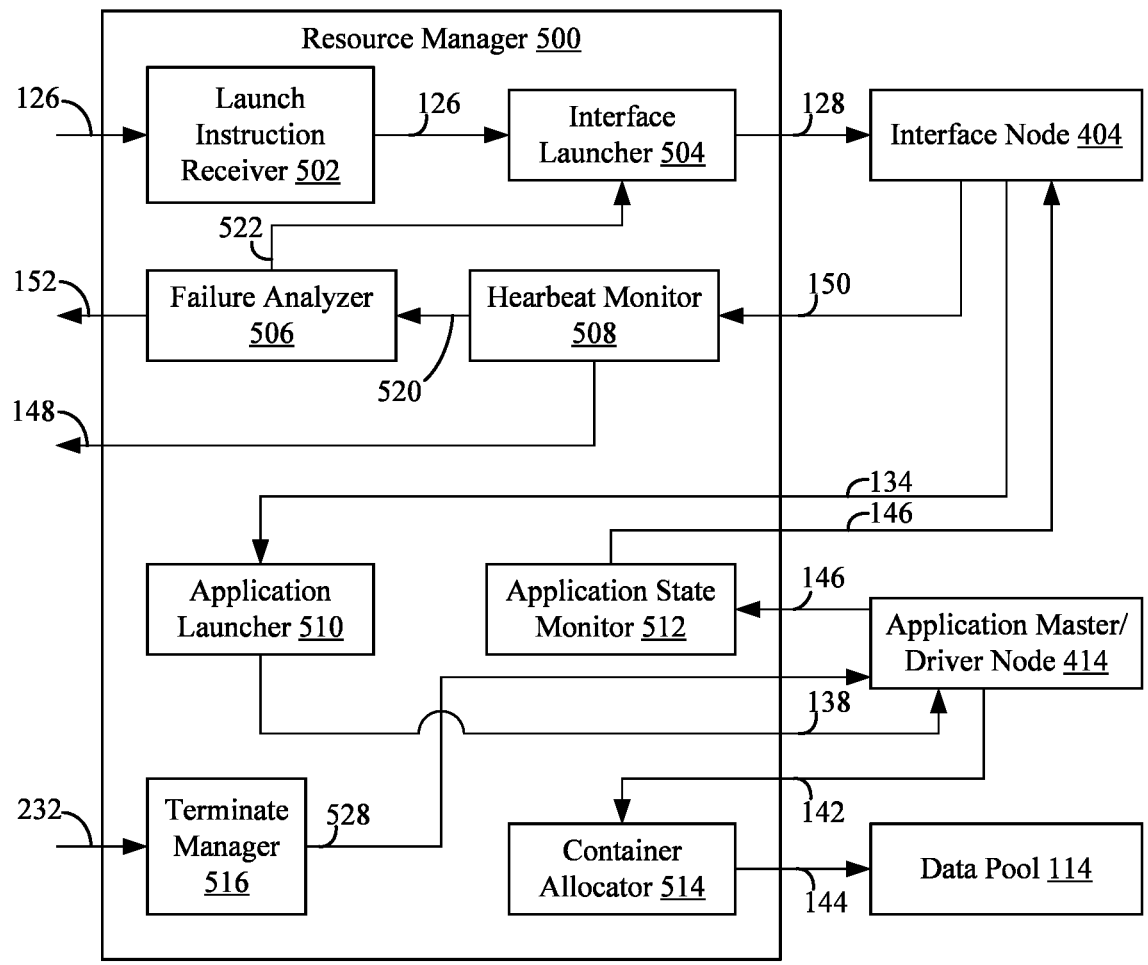
FIG. 5 is a block diagram of a resource manager, according to an example embodiment.

Resource managers may be configured in various ways, in embodiments. For instance, FIG. 5 is a block diagram of a resource manager 500, according to an example embodiment. Resource manager 500 is a further embodiment of resource manager 402 of FIG. 4, and is described as follows with respect to system 100 of FIG. 1 and cluster 400 of FIG. 4. Further structural and operational embodiments will be apparent to persons skilled in the relevant art(s) based on the following description.

As illustrated in FIG. 5, resource manager 500 includes launch instruction receiver 502, interface launcher 504, failure analyzer 506, heartbeat monitor 508, application launcher 510, application state monitor 512, container allocator 514, and terminate manager 516. Launch instruction receiver 502 receives launch instructions 126 from central job service component 104 of FIG. 1 and transmits launch instructions 126 to interface launcher 504.

Interface launcher 504 is configured to process launch instructions received from a central job service component and launch an interface on a compute cluster. For instance, interface launcher 504 receives launch instructions 126 and launches interface application master 412 on interface node 404 via launch signal 128.

Application launcher 510 is configured to process application launch instructions and launch an application on a compute cluster. For instance, application launcher 510 receives application launch instructions 134 from interface node 404 and launches driver 420 on application master and driver node 414 via launch signal 138.

Container allocator 514 is configured to allocate nodes for performing tasks and/or jobs associated with an application launched by resource manager 500. For instance, container allocator 514 receives a resource request 142 from application master and driver node 414 requesting for a number of resources to complete a job. Container allocator 514 allocates nodes of data pool 114 via allocate signal 144. In accordance with an embodiment, container allocator 514 allocates nodes of data pool 114 by launching one or more executors on nodes of data pool 114 via allocate signal 144.

Application state monitor 512 is configured to monitor application master and driver of application master and driver node 414. For instance, application state monitor 512 receives application state signal 146 from application master and driver node 414 indicative of a state of application 406. As stated above, application state signal 146 may indicate job progress, job completion, failure in performing a job or task associated with the job, resources used by application 112, and/or other information associated with the execution of application 112 on cluster 106. Application state monitor 512 may query application master and driver node 414 for application state signal 146 or receive application state signal 146 subsequent to application master and driver node 414 having completed the job, depending on the particular implementation. Application state monitor 512 is configured to transmit application state signal 146 to interface node 404. For instance, interface node 404 in accordance with an embodiment queries application state monitor 512 for application state signal 146.

Resource manager 500 is further configured to monitor operation of interfaces launched on a compute cluster. For instance, heartbeat monitor 508 is configured to receive a heartbeat signal 150 from interface node 404. Heartbeat signal 150 is a periodically generated signal that indicates interface application master 412 of interface node 404 is in operation. Heartbeat monitor 508 generates interface state signal 148 based on heartbeat signal 150. Interface state signal 148 represents the state of the interface application master of interface node 404. In accordance with an embodiment, heartbeat monitor 508 transmits interface state signal 148 to central job service component 104 of FIG. 1 in response to a query from central job service component 104, not shown in FIG. 5 for brevity and illustrative clarity. If heartbeat signal 150 is irregular or otherwise is not received in a predetermined period, heartbeat monitor 508 determines interface application master 412 has failed and generates a heartbeat error signal 520. While heartbeat error signal 520 and interface state signal 148 are illustrated as separate signals in FIG. 5, it is contemplated herein that heartbeat error signal 520 and interface state signal 148 may be the same signal.

Failure analyzer 506 receives heartbeat error signal 520 indicating an error in the operation of interface application master 412. Failure analyzer 506 analyzes heartbeat error signal 520 to determine if the interface is to be recovered. If the interface is to be recovered, failure analyzer 506 generates recovery instructions 522. Interface launcher 504 receives recovery instructions 522 and relaunches the interface on a node of the compute cluster. The interface may be launched on a new node or the same node, depending on the implementation. In accordance with an embodiment, the interface is relaunched on a node without requiring a relaunch of the application. For example, if the interface of interface node 404 fails but the application executing on application master and driver node 414 does not fail, interface launcher 504 may relaunch the interface on a node (either interface node 404 or a new node not shown in FIG. 5) without relaunching the application executing on application master and driver node 414. In this context, the relaunched interface is configured to manage the application executing on application master and driver node 414 as described with respect to interface node 404 above. In accordance with an embodiment, the relaunched interface is configured to recover a previous state store of the failed interface from a memory (e.g., memory device(s) 154 of FIG. 1) using a unique identifier.

In embodiments, resource manager 500 may receive instructions for terminating one or more applications in response to a failure of an interface. For instance, terminate manager 516 is configured to receive terminate instructions 232 from central job service component 104 of FIG. 1. Terminate manager 516 determines one or more applications to terminate based on terminate instructions 232. For instance, if terminate instructions 232 indicate a termination of applications associated with the failed interface of interface node 404, terminate manager 516 generates application terminate instructions 528. Application master and driver node 414 receives terminate instructions 528 and terminates application 406.

As stated above, FIG. 5 illustrates a resource manager 500 in accordance with an example embodiment, however, it is contemplated herein that resource manager 500 may be configured in various ways. For instance, resource manager 500 may include additional components not shown in FIG. 5 for illustrative clarity and brevity. Furthermore, one or more components of resource manager 500 may be implemented as a single component. For instance, application state monitor 512, heartbeat monitor 508, and/or failure analyzer 506 may be implemented as an application state monitor for monitoring interface application masters (e.g., interface application master 412 of interface node 404) and application 406. In accordance with an embodiment, interface launcher 504 and application launcher 510 are implemented as an application launcher for processing launch instructions for launching interfaces and application launch instructions for launching applications.

Figure 6A:
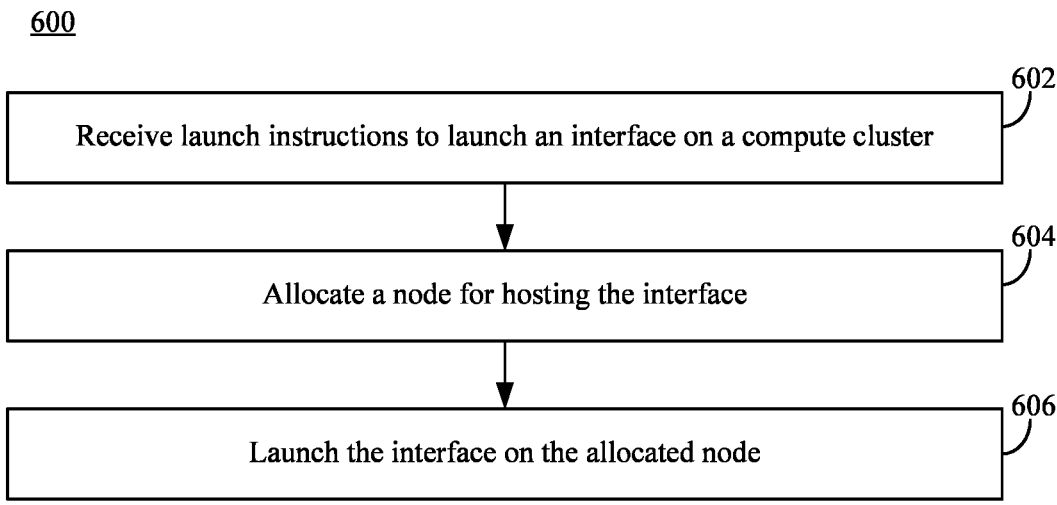
FIG. 6A is a flowchart of a process for launching an interface on a compute cluster, according to an example embodiment.

Note that resource manager 500 as illustrated in FIG. 5 may operate in various ways, in embodiments. For instance, resource manager 500 may be configured to launch an interface, launch an application, and/or allocate resources for performing a job. For example, FIG. 6A is a flowchart 600 of a process for launching an interface on a compute cluster, according to an example embodiment. In an embodiment, resource manager 500 may be configured to perform one or all of the steps of flowchart 600. Flowchart 600 is described as follows with respect to system 100 of FIG. 1, cluster 400 of FIG. 4, and resource manager 500 of FIG. 5. Further structural and operational embodiments will be apparent to persons skilled in the relevant art(s) based on the following description. Note that not all steps of flowchart 600 need to be performed in all embodiments.

Flowchart 600 begins with step 602. In step 602, launch instructions to launch an interface on a compute cluster are received. For instance, launch instruction receiver 502 of FIG. 5 receives launch instructions 126 to launch interface application master 412 on cluster 400 of FIG. 4. Launch instructions 126 may be a code statement, such as an API call or executable file, that interface launcher 504 interprets and processes to determine to launch an interface on cluster 400. In accordance with an embodiment, launch instructions 126 include job instructions.

In step 604, a node is allocated for hosting the interface. For instance, interface launcher 504 of FIG. 5 allocates interface node 404 for hosting interface application master 412 of FIG. 4. Interface node 404 may be a standalone node of cluster 400, or a node of a data pool, such as data pool 114.

In step 606, the interface is launched on the allocated node. For instance, interface launcher 504 of FIG. 5 launches interface application master 412 of FIG. 4 on allocated interface node 404 via launch signal 128. In accordance with an embodiment, steps 604 and 606 are performed simultaneously. For instance, interface launcher 504 may allocate interface node 404 to host interface application master 412 by launching interface application master 412 on interface node 404 via launch signal 128. In accordance with an embodiment, a node manager of interface node 404 (e.g., node manager 410) manages the launching and operation of interface application master 412 on interface node 404. In accordance with an embodiment, launch signal 128 includes job instructions.

Figure 6B:
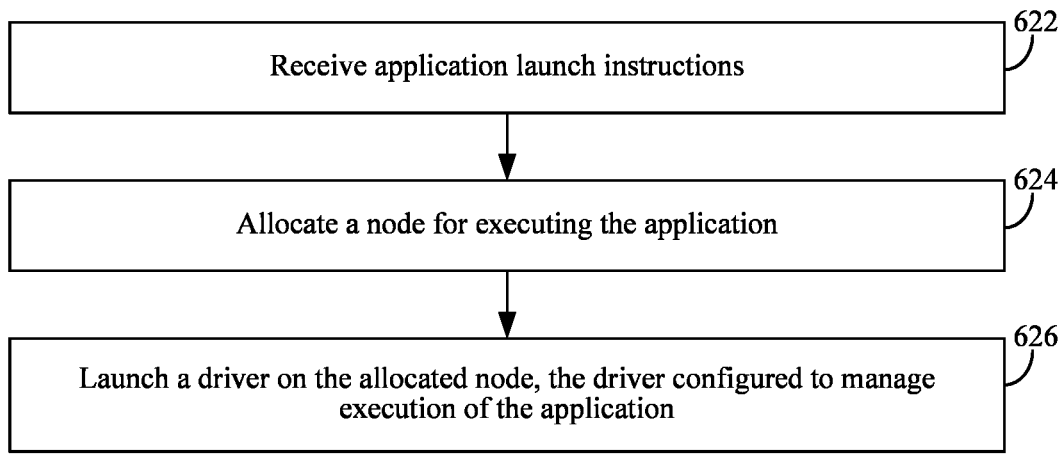
FIG. 6B is a flowchart of a process for launching an application on a compute cluster, according to an example embodiment.

As stated above, resource manager 500 as illustrated in FIG. 5 may be configured to launch an application in various ways. For instance, FIG. 6B is a flowchart 620 of a process for launching an application on a compute cluster, according to an example embodiment. In an embodiment, resource manager 500 may be configured to perform one or all of the steps of flowchart 620. Flowchart 620 is described as follows with respect to cluster 400 of FIG. 4 and resource manager 500 of FIG. 5. Further structural and operational embodiments will be apparent to persons skilled in the relevant art(s) based on the following description. Note that not all steps of flowchart 620 need to be performed in all embodiments.

Flowchart 620 begins with step 622, which may be performed subsequent to step 606 of flowchart 600. In step 622, application launch instructions are received. For instance, application launcher 510 receives application launch instructions 134 from interface node 404. In accordance with an embodiment, application launch instructions 134 include application job instructions 136.

In step 624, a node is allocated for executing the application. For instance, application launcher 510 of FIG. 5 allocates application master and driver node 414 for hosting driver 420 of FIG. 4. Application master and driver node 414 may be a standalone node of cluster 400, or a node of a data pool, such as data pool 114.

In step 626, a driver is launched on the allocated node. The driver is configured to manage execution of the application. For instance, application launcher 510 of FIG. 5 launches driver 420 of FIG. 4 on allocated application master and driver node 414 via launch signal 138. In accordance with an embodiment, steps 624 and 626 are performed simultaneously. For instance, application launcher 510 may allocate application master and driver node 414 to host driver 420 by launching driver 420 on application master and driver node 414 via launch signal 138. In accordance with an embodiment, anode manager of application master and driver node 414 (e.g., node manager 418) manages the launching and operation of driver 420 on application master and driver node 414. In accordance with an embodiment, launch signal 138 includes application job instructions. In this example, the driver launched on application master and driver node 414 begins processing the included application job instructions subsequent to launching on application master and driver node 414.

Figure 6C:
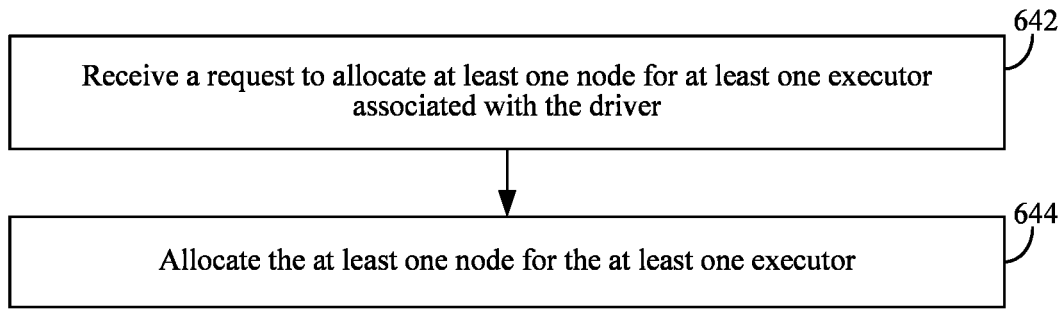
FIG. 6C is a flowchart of a process for allocating resources for performing a job, according to an example embodiment.

As stated above, resource manager 500 as illustrated in FIG. 5 may be configured to allocate resources for performing a job in various ways. For instance, FIG. 6C is a flowchart 640 of a process for allocating resources for performing a job, according to an example embodiment. In an embodiment, resource manager 500 may be configured to perform one or all of the steps of flowchart 640. Flowchart 640 may be performed subsequent to step 626 of flowchart 620 of FIG. 6B. Flowchart 640 is described as follows with respect to cluster 400 of FIG. 4 and resource manager 500 of FIG. 5. Further structural and operational embodiments will be apparent to persons skilled in the relevant art(s) based on the following description. Note that not all steps of flowchart 640 need to be performed in all embodiments.

Flowchart 640 begins with step 642, which may be subsequent to flowchart 620. In step 642, a request to allocate at least one node for at least one executor associated with the driver is received. For instance, container allocator 514 receives a resource request 142 from application master and driver node 414 to allocate at least one node for at least one executor associated with the driver.

In step 644, the at least one node is allocated for the at least one executor. For instance, container allocator 514 allocates at least one node of data pool 114 by transmitting allocate signal 144 to the node for hosting at least one executor. In accordance with an embodiment, allocate signal 144 launches an executor on the allocated node. In some embodiments, more than one executors may be launched on a single node. In a non-limiting example, executors performing similar tasks and/or low bandwidth tasks may be launched on the same node.

Figure 7:
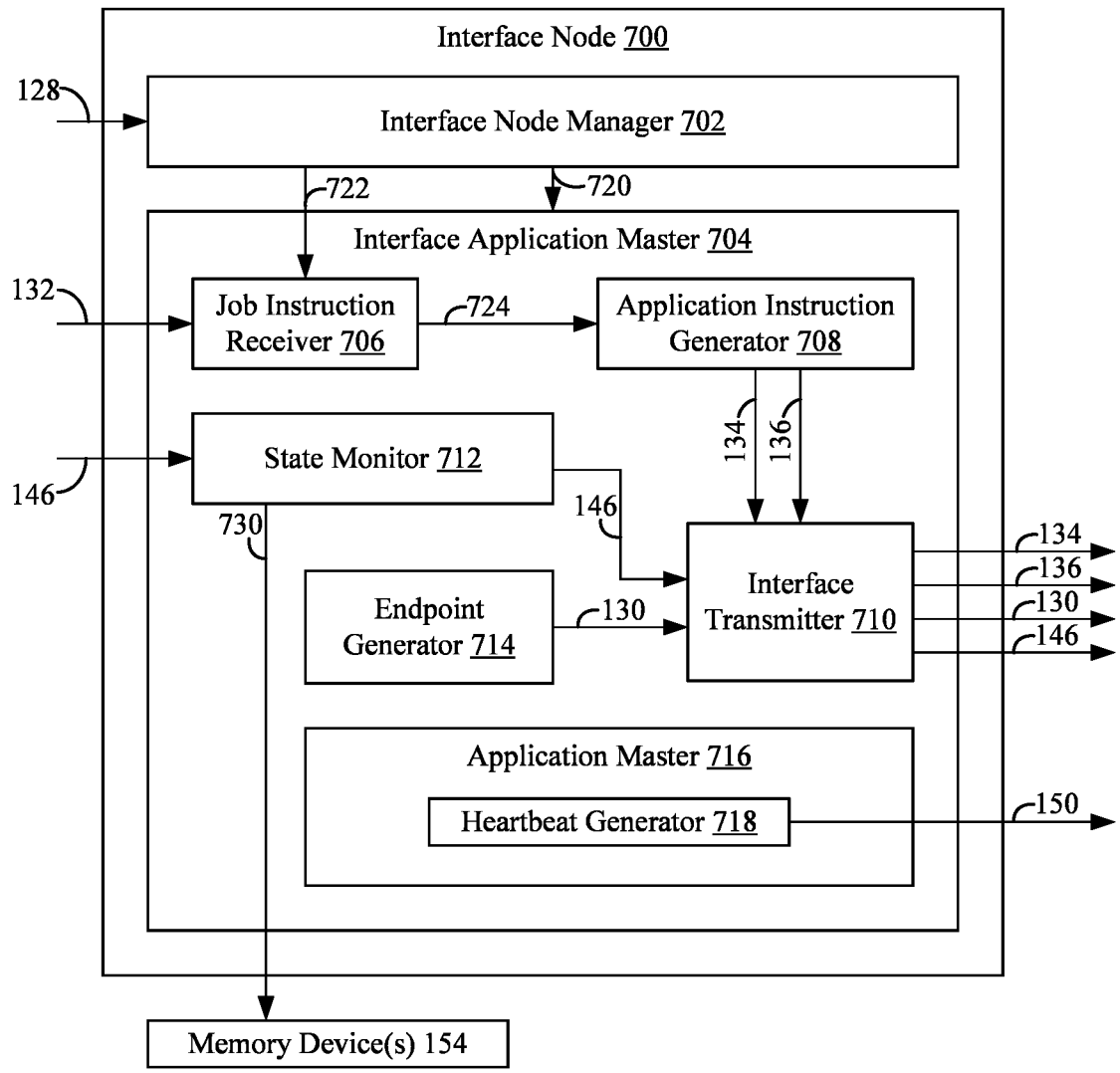
FIG. 7 is a block diagram of an interface node, according to an example embodiment.

Interface nodes may be configured in various ways, in embodiments. For instance, FIG. 7 is a block diagram of an interface node 700, according to an example embodiment. Interface node 700 is a further embodiment of interface node 404 of FIG. 4. Interface node 700 is described below with reference to system 100 of FIG. 1 and cluster 400 of FIG. 4. Further structural and operational embodiments will be apparent to persons skilled in the relevant art(s) based on the following description.

As illustrated in FIG. 7, interface node 700 includes an interface node manager 702 ("node manager 702" hereafter) and an interface application master 704. Node manager 702 is a further embodiment of node manager 410 of FIG. 4 and is a service implemented on interface node 700 configured to manage operation of interface node 700. For instance, node manager 702 manages the launching of interface application master 704, termination of interface application master 704, and other operations associated with interface node 700, as described elsewhere herein. For example, node manager 702 receives launch signal 128 and launches interface application master 704 via interface launch signal 720. In accordance with an embodiment, launch signal 128 includes job instructions 722. In this context, interface node manager 702 transmits job instructions 722 to interface application master 704.

Interface application master 704 is a further embodiment of interface application master 412 of FIG. 4 and is a service implemented on interface node 700. As shown in FIG. 7, interface application master 704 includes a job instruction receiver 706, an application instruction generator 708, an interface transmitter 710, a state monitor 712, an endpoint generator 714, and an application master 716. Job instruction receiver 706 is configured to receive job instructions 132 from central job service component 104 of FIG. 1 and/or job instructions 722 from interface node manager 702. In accordance with an embodiment, job instructions 722 and/or job instructions 132 include a code statement. Job instruction receiver 706 transmits a job instruction signal 724 representative of the received job instructions.

Application instruction generator 708 is configured to generate instructions based on job instruction signal 724. For instance, application instruction generator 708 may generate instructions to launch an application, to perform a job, to retrieve job progress, retrieve a state of the interface, submit one or more code statements, and/or the like. For example, application instruction generator 708 may generate application launch instructions 134 and/or application job instructions 136 based on job instruction signal 724. In accordance with an embodiment, application instruction generator 708 generates instructions based on a code statement associated with job instruction signal 724.

State monitor 712 is configured to monitor execution of one or more associated applications and generate state stores of interface application master 704. For instance, state monitor 712 monitors execution of application 406 on cluster 400 of FIG. 4 via application state signal 146. As shown in FIG. 7, state monitor 712 transmits application state signal 146 generates a state store 730. For instance, state monitor 712 may transmit application state signal 146 in response to a request received from central job service component 104 of FIG. 1. State monitor 712 may generate state store 730 based on application state signal 146. In embodiments, state store 730 may include an endpoint value of interface application master 704, a session ID of interface application master 704, an operating state of interface application master 704, a state of application 406, job progress of a job performed by application 406, resources associated with application 406, and/or other information associated with the operation of interface application master 704. State monitor 712 may generate state store 730 periodically and/or in response to a state request.

Endpoint generator 714 is configured to generate an endpoint value 130. As stated above with respect to FIG. 1, endpoint value 130 is utilized by central job service component 104 to communicate with interface application master 704. In accordance with an embodiment, endpoint generator 714 generates endpoint value 130 subsequent to interface application master 704 launching on interface node 700. In accordance with an embodiment, endpoint value 130 expires after a predetermined period. In this embodiment, endpoint generator 714 is configured to generate an updated endpoint value 130 before the predetermined period. For instance, in an illustrative example, endpoint value 130 expires every 10 minutes and endpoint generator 714 updates endpoint value 130 every minute. In accordance with an embodiment, endpoint value 130 is generated using an in-memory store client.

Interface transmitter 710 is configured to transmit signals to resource manager 402 of FIG. 4 and/or central job service component 104 of FIG. 1. As shown in FIG. 7, interface transmitter 710 transmits application launch instructions 134 to resource manager 402, transmits application job instructions to driver 420, and transmits application state signal 146 and/or endpoint value 130 to central job service component 104.

Application master 716 is configured to coordinate execution of interface application master 704. Depending on the implementation, application master 716 may perform various functions of interface application master 704. For example, as shown in FIG. 7, application master 716 includes a heartbeat generator 718 that is configured to generate a heartbeat signal 150. As described above with respect to FIG. 5, heartbeat signal 150 is a periodically generated signal that indicates interface application master 704 is in operation. As described with respect to FIG. 5, heartbeat generator 718 transmits heartbeat signal 150 to resource manager 500, however, it is also contemplated herein that heartbeat generator 718 may transmit heartbeat signal 150 to central job service component 104 of FIG. 1, or a subcomponent of the compute cluster that interface node 700 is implemented on.

Figure 8:
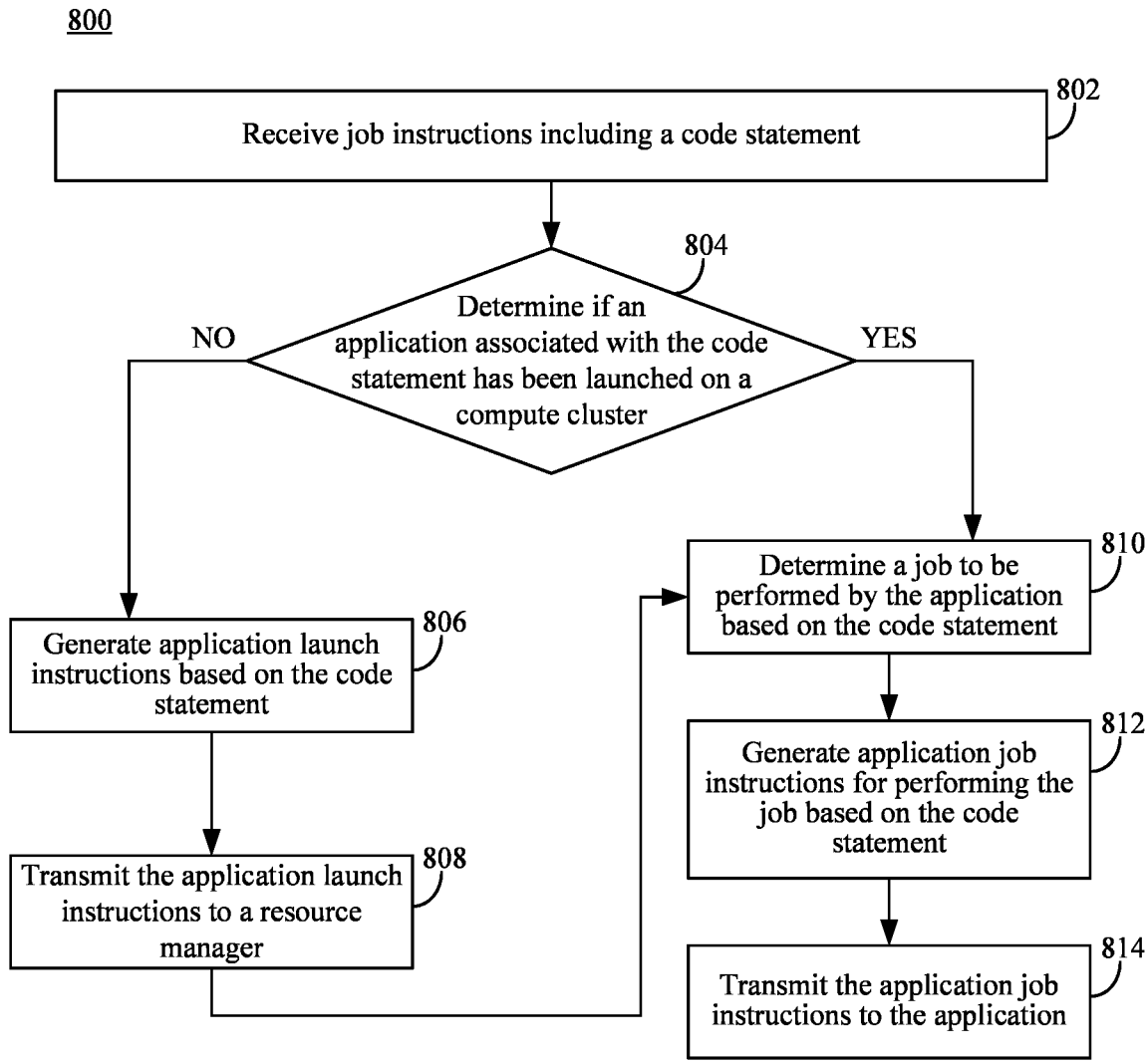
FIG. 8 is a flowchart of a process for transmitting application launch instructions and application job instructions, according to an example embodiment.

Note that interface node 700 as illustrated in FIG. 7 may transmit application launch instructions and/or application job instructions in various ways, in embodiments. For instance, FIG. 8 is a flowchart 800 of a process for transmitting application launch instructions and application job instructions, according to an example embodiment. In an embodiment, interface node 700 is configured to perform one or all of the steps of flowchart 800. Flowchart 800 is described as follows with respect to system 100 of FIG. 1, cluster 400 of FIG. 4, and interface node 700 of FIG. 7. Further structural and operational embodiments will be apparent to persons skilled in the relevant art(s) based on the following description. Note that not all steps of flowchart 800 need to be performed in all embodiments.

Flowchart 800 begins with step 802. In step 802, job instructions including a code statement are received. For instance, job instruction receiver 706 of FIG. 7 receives job instructions 132 including a code statement and transmits job instruction signal 724 representative of job instructions 132. For example, interface application master 704 includes an application master resource manager (AMRM) client configured to extend an entry point of interface application master 704. In this context, job instruction receiver 706 is the entry point of interface application master 704. In a non-limiting example, interface application master 704 is a Livy instance launched as an application master on a node of a YARN cluster. In this example, interface application master 704 includes a Livy server class that is extended to provide an entry point for job instructions from central job service component 104 of FIG. 1 (i.e., job instruction receiver 706) by implementing a YARN AMRM client. While job instructions 132 received in step 802 are described as including a code statement, it is contemplated herein that job instructions 132 may include other information in addition to or in place of the code statement. For instance, job instructions 132 in accordance with an embodiment include an executable file (e.g., a .jar file, a .exe file, and/or the like).

In step 804, a determination if an application associated with the code statement has been launched on a compute cluster is made. For instance, if job instructions 132 included a code statement associated with application 406 of FIG. 4, application instruction generator 708 of FIG. 7 determines if application 406 is launched on cluster 400. If application 406 is not launched, flowchart 800 continues to step 806. If application 406 is launched, flowchart 800 continues to step 810.

In step 806, application launch instructions are generated based on the code statement. For instance, application instruction generator 708 generates application launch instructions 134 based on the code statement of job instructions 132.

In step 808, application launch instructions are transmitted to a resource manager. For instance, interface transmitter 710 of FIG. 7 transmits application launch instructions 134 to resource manager 402 of FIG. 4.

In step 810, a job to be performed by the application is determined based on the code statement. For instance, application instruction generator 708 of FIG. 7 determines a job to be performed by application 406 of FIG. 4 based on the code statement of job instructions 132. Application instruction generator 708 may determine a job type, a size of data associated with the job, configurations for application 406, locations for reading data from and/or writing data to, a number of tasks to perform the job, a number of and/or type of resources to perform the job, bandwidth for performing the job, and/or other data associated with the job and/or performance thereof.

In step 812, application job instructions for performing the job are generated based on the code statement. For instance, application instruction generator 708 of FIG. 7 generates application job instructions 136 for performing the job determined in step 810 based on the code statement of job instructions 132. Application instructions 726 may include one or more subset of instructions for performing a task of the job, depending on the particular implementation.

In step 814, the application job instructions are transmitted to the application. For instance, interface transmitter 710 of FIG. 7 transmits application job instructions 136 to driver 420 of FIG. 4. In accordance with an embodiment, steps 808 and 814 may be performed simultaneously by transmitting application launch instructions 134 and application job instructions 136 as a set of instructions to resource manager 402. In this context, step 810 is performed subsequently to step 806, and steps 808 and 814 are performed subsequently to step 812.

III. Example Application and Interface Monitoring Embodiments

Embodiments of the present disclosure may monitor the operation of interfaces and the execution of applications. Monitoring enables detection of failures, state store generation, job progress updates, and/or the like, depending on the particular implementation. For instance, an interface in accordance with an embodiment includes a state monitor that generates a state store of the interface, monitors execution of the application executing on the compute cluster, and generates reports indicative of the operation of the interface and/or the application.

Figure 9:
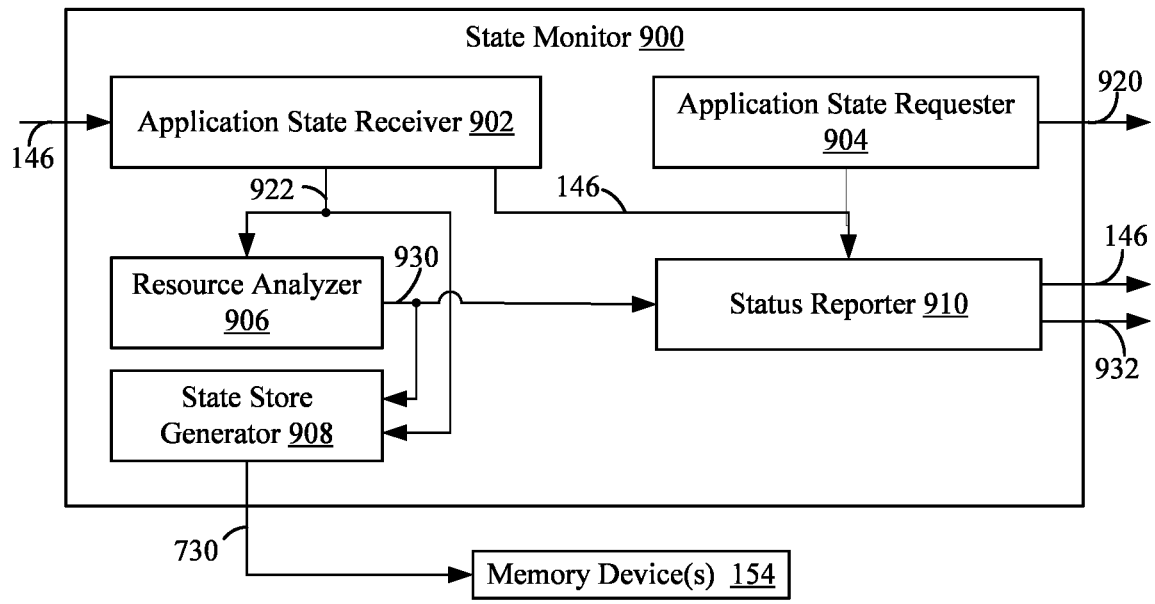
FIG. 9 is a block diagram of a state monitor, according to an example embodiment.

In embodiments, state monitor 712 of FIG. 7 may be configured in various ways. For example, FIG. 9 is a block diagram of a state monitor 900, according to an example embodiment. State monitor 900 is a further embodiment of state monitor 712 of FIG. 7. As illustrated in FIG. 9, state monitor 900 includes an application state receiver 902, an application state requester 904, resource analyzer 906, state store generator 908, and state reporter 910. Application state requester 904 is configured to generate an application state request 920. In embodiments, interface application master 704 of FIG. 7 transmits application state request 920 to resource manager 402 of FIG. 4 to determine a state of application 406 and/or progress of a job performed by application 406. Application state requester 904 may generate application state request 920 periodically and/or in response to a state request, depending on the particular implementation. For instance, application state requester 904 in accordance with an embodiment periodically transmits application state request 920 to monitor job progress.

Application state receiver 902 receives application state signal 146 and generates application state 922. In embodiments, application state signal 146 may be received continuously, semi-continuously, periodically, and/or subsequent to application state requester 904 transmitting application state request 920. In embodiments, application state 922 is indicative of the information included with application state signal 146. As shown in FIG. 9, application state receiver 914 may transmit the received application state signal 146, e.g., for reporting to central job service component 104 of FIG. 1.

Resource analyzer 906 is configured to analyze resource usage of application 406. As shown in FIG. 9, resource analyzer 906 receives application state 922. In this context, application state 922 may include information such as a count of resources and/or types of resources used by application 406 of FIG. 4 for performing a job. In accordance with an embodiment, resource analyzer 906 determines a number of executors allocated for executing tasks of a job. Resource analyzer 906 generates a resource analysis signal 930 based on an analysis of resource usage of application 406. In embodiments, resource analysis signal 930 may indicate resource types of resources for performing a job, task distribution across resources, a number of resources utilized to perform a job and/or task, inefficiencies in performing a job, resource deficiencies in performing a job, failure and/or errors of resources, and/or other information determined by analyzing resource usage of application 406, as described elsewhere herein or as would be understood by a person of skill in the relevant art(s) having the benefit of this disclosure.

State reporter 910 is configured to transmit application state signal 146 and/or generate a report signal 932. For instance, state reporter 910 may generate report signal 932 based on application state signal 146 and/or resource analysis signal 930. In embodiments, report signal 932 may include information associated with application state signal 146, resource analysis signal 930, and/or other information associated with the operation of state monitor 900.

State store generator 908 is configured to generate and store a state store 730 of interface application master 704 of FIG. 7. State store generator 908 may generate state store 730 based on application state 922, resource analysis signal 930, and/or other information associated with the operation of interface node 700 an/or application 406 of FIG. 4. State store generator 908 stores state store 730 in memory device(s) 154. In accordance with an embodiment, state store generator 908 overwrites a previously stored state store stored in memory device(s) 154 with state store 730. State store 730 includes information associated with the operation of interface application master 704 of FIG. 7 (e.g., an endpoint value, a session ID, a job log, etc.) and/or the operation of application 406 of FIG. 4 (e.g., allocated resources, jobs performed, tasks performed, job progress, etc.), in embodiments. State store generator 908 may periodically generate state store 730 or generate state store 730 in response to a state request, in embodiments.

State stores stored in memory device(s) 154 may be transmitted to other components of systems implementing state monitor 900 and interface node 700. For instance, the state store stored in memory device(s) 154 may be transmitted to another component of cluster 400 of FIG. 4 (e.g., resource manager 402) and/or central job service component 104 of FIG. 1. State stores may be stored, transferred, and/or accessed via a coordination server (e.g., Apache Zookeeper™) or a file system. In an illustrative example, state stores are logged in a folder with an application ID. In this way, state stores for interface application master 704 may be accessed using the application ID of interface application master 704. For instance, central job service component 104 and/or cluster 400 may attempt to recover interface application master 704 if it fails by accessing a state store with a matching application ID.

Figure 10:
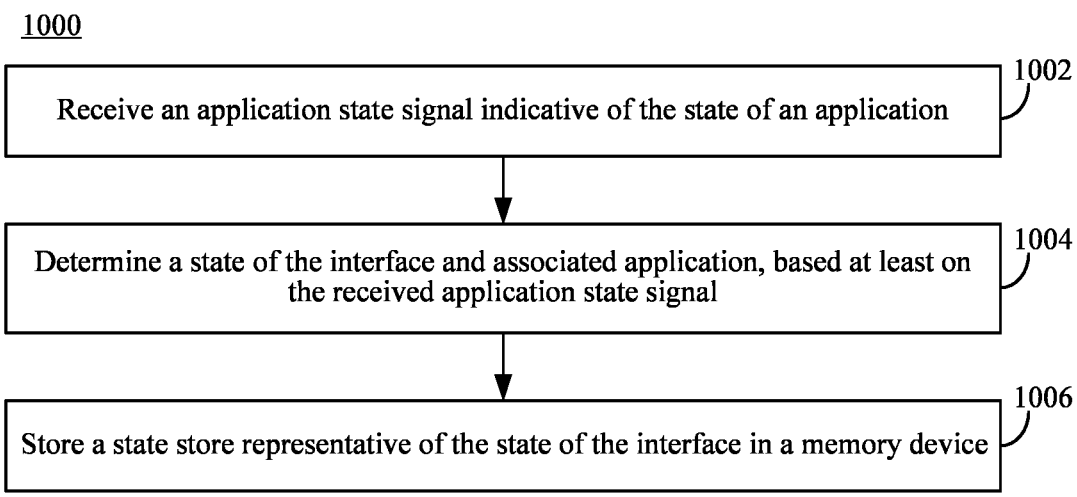
FIG. 10 is a flowchart of a process for generating a state store, according to an example embodiment.

State monitor 900 may generate state stores in various ways, in embodiments. For instance, FIG. 10 is a flowchart 1000 of a process for generating a state store, according to an example embodiment. In an embodiment, state monitor 900 may be configured to perform one or all of the steps of flowchart 1000. Flowchart 1000 is described as follows with respect to system 100 of FIG. 1, cluster 400 of FIG. 4, interface node 700 of FIG. 7, and state monitor 900 of FIG. 9. Further structural and operational embodiments will be apparent to persons skilled in the relevant art(s) based on the following description. Note that steps of flowchart 1000 may be performed in an order different than shown in FIG. 10 in some embodiments. Furthermore, not all steps of flowchart 1000 need to be performed in all embodiments.

Flowchart 1000 starts with step 1002. In step 1002, an application state signal indicative of the state of an application is received. For instance, application state receiver 902 receives application state signal 146 from resource manager 402 of FIG. 4. Application state signal 146 may be received periodically and/or responsive to an application state request, such as application state request 920 generated by application state requester 904.

In step 1004, a state of the interface and associated application are determined based at least on the received application state signal. For instance, state store generator 908 determines a state of interface application master 704 of FIG. 7 based at least on application state 922, which is representative of application state signal 146. In accordance with an embodiment, state store generator 908 may determine a state of interface application master 704 based on one or more of application state 922, resource analysis signal 930, an indication of the operating state of interface application master 704 (e.g., an indication from application master 716), endpoint value 130, and/or other information associated with the operation of interface application master 704, as described elsewhere herein.

In step 1006, a state store representative of the state of the interface is stored in a memory device. For instance, state store generator 908 stores state store 730 in memory device(s) 154. In accordance with an embodiment, state stores may be stored, transferred, and/or accessed via a coordination server (e.g., Apache Zookeeper™) or a file system. In an illustrative example, state stores are logged in a folder with an application ID.

Thus, various embodiments and techniques for monitoring an application have been described and illustrated with respect to FIGS. 9 and 10. It is further contemplated herein that state monitor 900 may be modified to generate application state signal 146, state store 730, and/or report signal 932 in other ways, as described elsewhere herein or as would be understood by a person of skill in the relevant art(s) having benefit of this disclosure. For instance, report signal 932 may be generated based on state store 730 or a previously stored state store of interface application master 704.

Figure 11:
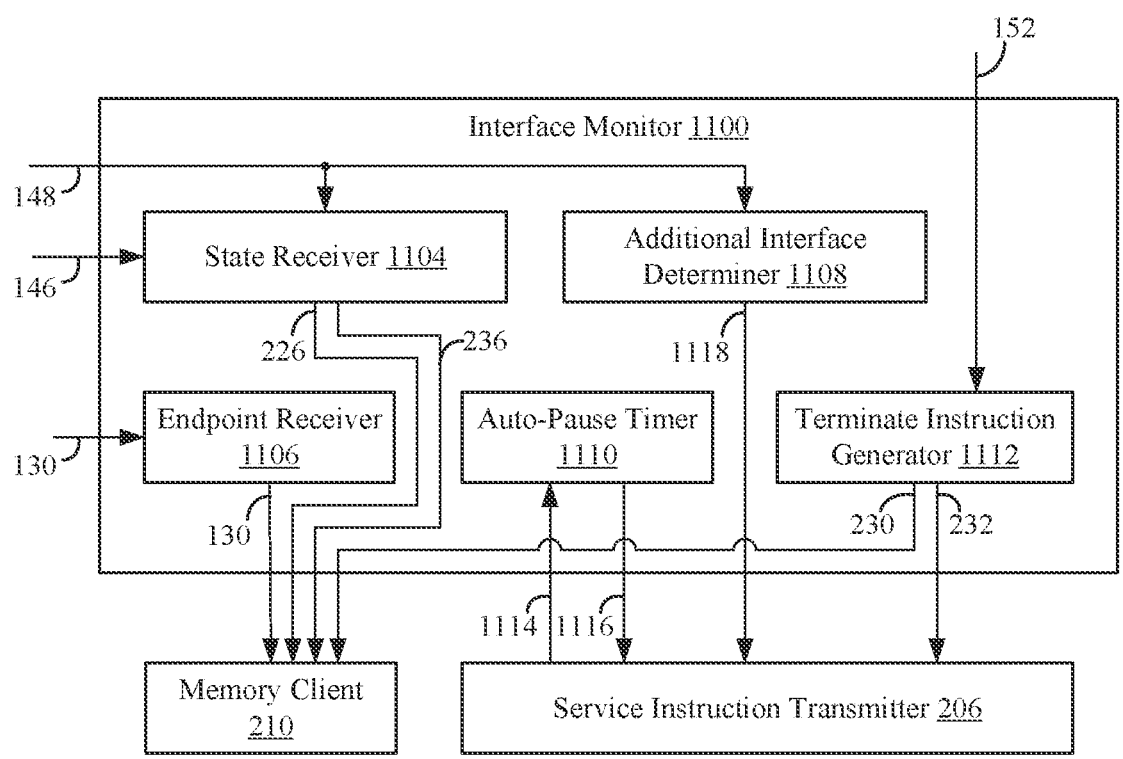
FIG. 11 is a block diagram of an interface monitor, according to an example embodiment.

As stated above, embodiments of the present disclosure may monitor the operation of interfaces in various ways. For example, central job service component 200 of FIG. 2 includes an interface monitor 208 for monitoring interfaces, such as interface node 700 of FIG. 7. Interface monitor 208 may be configured in various ways. For instance, FIG. 11 is a block diagram of an interface monitor 1100, according to an example embodiment. Interface monitor 1100 is a further embodiment of interface monitor 208 of FIG. 2. As illustrated in FIG. 11, interface monitor 1100 includes a state receiver 1104, an endpoint receiver 1106, an additional interface determiner 1108, an auto-pause timer 1110, and terminate instruction generator 1112.

State receiver 1104 receives application state signal 146 from interface node 404 and interface state signal 148 from resource manager 402 of FIG. 4 and generates application state information 226 and interface state information 236, respectively. Application state information 226 and interface state information 236 are stored in memory (e.g., memory device(s) 212 of FIG. 2) by memory client 210. Application state signal 146 and interface state signal 148 may be received periodically, or in response to a request transmitted by central job service component 104 to cluster 106, depending on the particular implementation.

Endpoint receiver 1106 receives endpoint value 130 and transmits it to memory client 210 of FIG. 2 for storage in memory (e.g., a memory device(s) 212). As stated above, endpoint value 130 may be an encode value with a session ID as a key.

Additional interface determiner 1108 is configured to obtain a metric indicative of an operational state of an interface, and, based at least on the metric, determine if an additional interface is to be launched on cluster 400 of FIG.

4. As shown in FIG. 11, receives interface state signal 148 from resource manager 402 of FIG. 4 and determines based on interface state signal 148 if an additional interface is to be launched. It is contemplated herein that additional interface determiner 1108 may obtain metrics indicative of an operational state of an interface in other ways, in embodiments. For instance, additional interface determiner 1108 may receive metrics stored in memory device(s) 112 of FIG. 1, generated by cluster 400, received via application state signal 146, received from gateway 102, measured by a component of central job service component 102, and/or otherwise generated during the operation of system 100 and components thereof, as described elsewhere herein. Such metrics may include an expected completion time of a job, an average job completion time, a number of jobs rejected by cluster 400, a number of jobs being performed by cluster 400, state store(s) of one or more interfaces, job logs, and/or other information associated with the operation of system 100.

As shown in FIG. 11, additional interface determiner 1108 is configured to generate additional launch instructions 1118. For instance, if additional interface determiner 1108 determines to launch an additional interface, additional interface determiner generates additional launch instructions 1118. Additional launch instructions 1118 are transmitted to cluster 400 of FIG. 4 via service instruction transmitter 206 to cause an additional interface to launch on cluster 400.

Auto-pause timer 1110 is configured to pause or terminate interfaces of cluster 400 of FIG. 4. For instance, auto-pause timer 1110 may terminate interface application master 412 if a subsequent job request associated with application 406, a subsequent job request associated with interface application master 412, or a request to launch an additional application associated with interface application master 412 is not received by interface application master 412 within a predetermined time. As shown in FIG. 11, auto-pause timer 1110 receives a job notification 1114 from service instruction transmitter 206. Job notification 1114 is indicative of service instruction transmitter 206 transmitting a subsequent job request to interface application master 412. While job notification 1112 is illustrated in FIG. 11 as a signal generated by service instruction transmitter 206, it is contemplated herein that job notification 1114 may be application job instructions 136, a signal generated by job request receiver 202, a signal generated by job request analyzer 204, a signal generated by cluster 400, and/or another signal indicative of interface node 404 receiving a subsequent job request associated with application 406, as described elsewhere herein or as would be understood by a person of skill in the relevant art(s) having benefit of this disclosure. If job notification 1114 is not received within a predetermined time, auto-pause timer 1110 generates interface auto-pause instructions 1116. Service instruction transmitter 206 transmits interface auto-pause instructions 1116 to cluster 400 to cause interface application master 412 to pause or terminate. The predetermined time may be a time determined by interface monitor 1100, determined by cluster 400, included in job request 124, and/or the like. While FIG. 11 illustrates auto-pause timer 1110 as part of interface monitor 1100, it is contemplated herein that auto-pause timer 1110 may be a separate component of central job service component 200 of FIG. 2, a component or subcomponent of cluster 400, and/or a component or subcomponent of system 100 of FIG. 1, depending on the particular implementation.

Terminate instruction generator 1112 is configured to receive error signal 152 from resource manager 402 of FIG. 4 and generate failure information 230 and terminate instructions 232. Error signal 152 indicates an error in operation of an interface, such as interface application master 412. For example, error signal 152 may indicate interface application master 412 has failed more than a predetermined number of times. Responsive to error signal 152, terminate instruction generator 1112 generates failure information 230 for storage in memory by memory client 210. Terminate instruction generator 1112 is configured to determine applications associated with the failed interface and generate terminate instructions 232. Service instruction transmitter 206 transmits terminate instructions 232 to cluster 400 to cause the determined associated applications to terminate.

Interface monitor 1100 may include additional components, not shown in FIG. 11 for brevity and illustrative clarity. For instance, interface monitor may include components for determining if an interface should be terminated, analyzing results from completed jobs, analyzing various metrics described elsewhere herein, and/or the like. In accordance with an embodiment, interface monitor 1100 includes a heartbeat monitor that monitors heartbeat signal 150, similar to heartbeat monitor 508 of resource manager 500, as shown in FIG. 5.

Figure 12A:
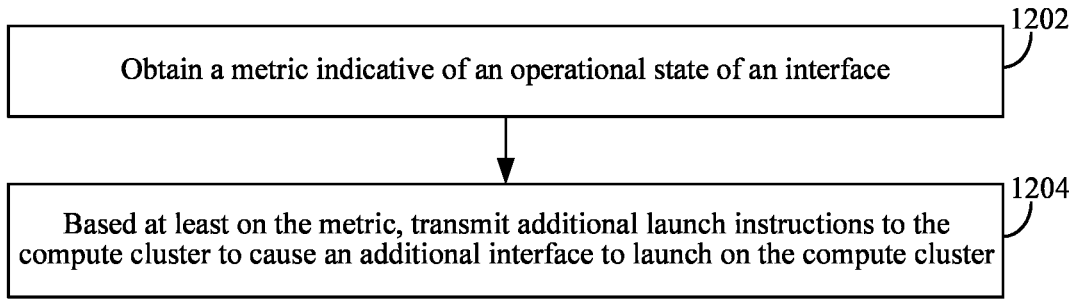
FIG. 12A is a flowchart of a process for launching an additional interface, according to an example embodiment.

In an embodiments, interface monitor 1100 may operate in various ways. For example, interface monitor 1100 may be configured to launch an additional interface on cluster 400 of FIG. 4 or terminate applications associated with a failed interface of cluster 400. For instance, FIG. 12A is a flowchart 1200 of a process for launching an additional interface, according to an example embodiment. Interface monitor 1100 may perform one or all of the steps of flowchart 1200, in an embodiment. Note that the steps of flowchart 1200 may be performed in an order different than shown in FIG. 12A in some embodiments. Furthermore, not all steps of flowchart 1200 need to be performed in all embodiments. Further structural and operational embodiments will be apparent to persons skilled in the relevant art(s) based on the following description. Flowchart 1200 is described as follows with respect to system 100 of FIG. 1 and interface monitor 1100 of FIG. 11.

Flowchart 1200 begins with step 1202. In step 1202, a metric indicative of an operational state of an interface is obtained. For instance, additional interface determiner 1108 is configured to obtain a metric indicative of an operational state of interface 110 of FIG. 1. For example, as shown in FIG. 11, additional interface determiner 1108 receives interface state signal 148, which includes at least one metric indicative of an operational state of interface 110. Metrics may be obtained in other ways, such as from interface monitor 1100 monitoring job requests transmitted to interface 110, interface monitor 1100 generating metrics as a result of analyzing interface state signal 148, metrics stored in memory device(s) 212 of FIG. 2, and/or other techniques for obtaining metrics described elsewhere herein.

In step 1204, based at least on the metric, additional launch instructions are transmitted to the compute cluster to cause an additional interface to launch on the compute cluster. For instance, additional interface determiner 1108 may determine if one or more metrics obtained in step 1202 indicates an additional interface is to be launched on compute cluster 106. If additional interface determiner 1108 determines to launch an additional interface, additional interface determiner 1108 generates additional launch instructions 1118. Service instruction transmitter 206 transmits additional launch instructions 1118 to cluster 106 to cause an additional interface to launch on cluster 106.

Figure 12B:
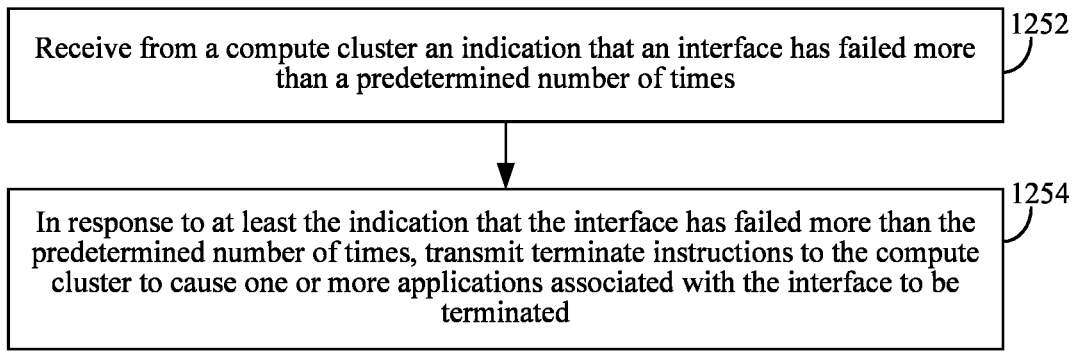
FIG. 12B is a flowchart of a process for terminating an application associated with a failed interface, according to an example embodiment.

As stated above, interface monitor 1100 may be configured to terminate applications associated with a failed interface. For instance, FIG. 12B is a flowchart 1250 of a process for terminating an application associated with a failed interface, according to an example embodiment. Interface monitor 1100 may perform one or all of the steps of flowchart 1250, in an embodiment. Note that the steps of flowchart 1250 may be performed in an order different than shown in FIG. 12B in some embodiments. Furthermore, not all steps of flowchart 1250 need to be performed in all embodiments. Further structural and operational embodiments will be apparent to persons skilled in the relevant art(s) based on the following description. Flowchart 1250 is described as follows with respect to system 100 of FIG. 1 and interface monitor 1100 of FIG. 11.

Flowchart 1250 begins with step 1252. In step 1252, an indication that an interface has failed more than a predetermined number of times is received from a compute cluster. For instance, terminate instruction generator 1112 of FIG. 11 receives error signal 152 from cluster 400 of FIG. 4. In accordance with an embodiment, error signal 152 is indicative of interface application master 412 having failed more than a predetermined number of times.

In step 1254, in response to at least the indication that the interface has failed more than the predetermined number of times, terminate instructions are transmitted to the compute cluster to cause one or more applications associated with the interface to be terminated. For instance, terminate instruction generator 1112 of FIG. 11 generates terminate instructions 232 in response to at least error signal 152. Terminate instructions 232 include instructions to terminate one or more applications associated with the failed interface. For example, application 406 is associated with interface application master 412 and terminate instructions 232 include instructions for terminating application 406. Service instruction transmitter 206 transmits terminate instructions 232 to compute cluster 400 of FIG. 4 to cause application 406 to be terminated. In this way, applications, application masters, and/or executors utilizing resources of cluster 106 without an associated interface are cleaned up.

Figure 13:
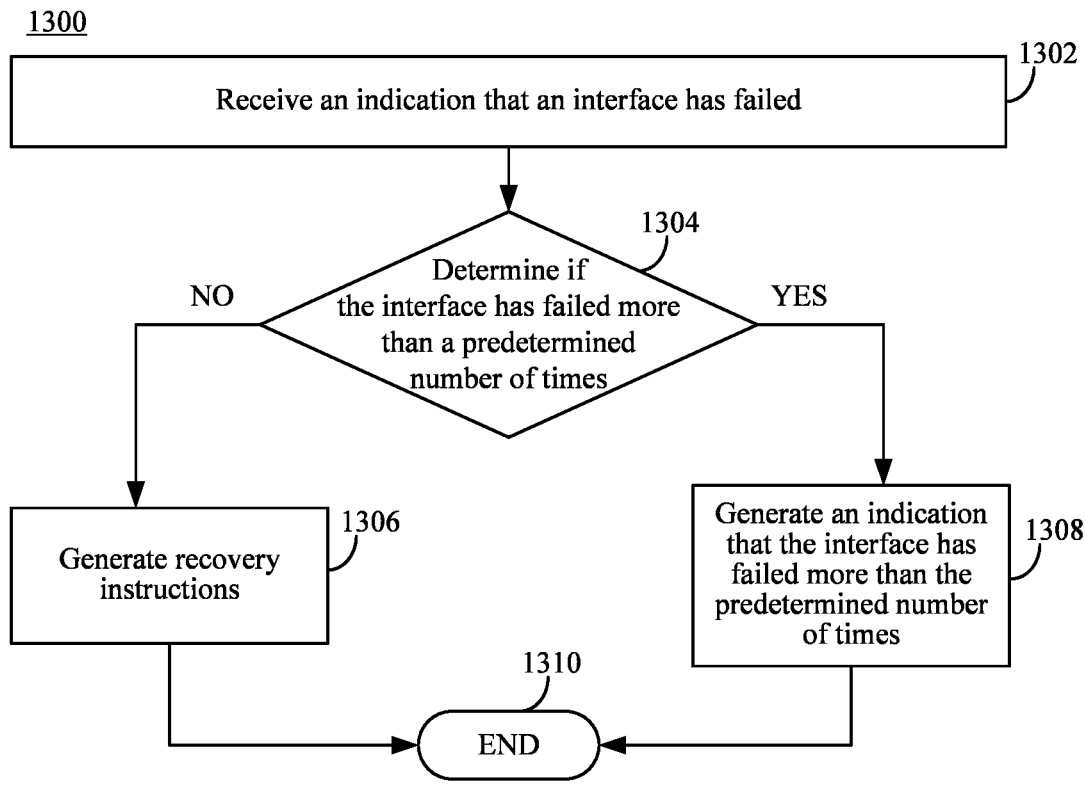
FIG. 13 is a flowchart of a process for responding to a failure of an interface, according to an example embodiment.
Figure 14:
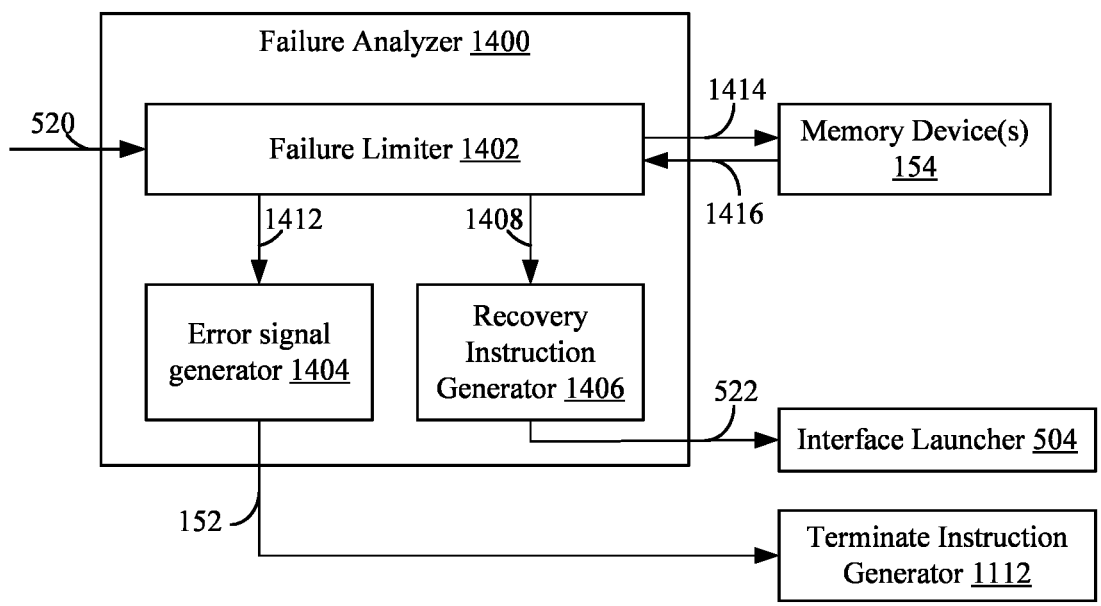
FIG. 14 is a block diagram of a failure analyzer, according to an example embodiment.

In embodiments, failure analyzer 506 of FIG. 5 may operate in various ways to respond to a failure of an interface. For example, FIG. 13 is a flowchart 1300 of a process for responding to a failure of an interface, according to an example embodiment. Failure analyzer 506 may operate according to flowchart 1300, in an embodiment. For purposes of illustration, flowchart 1300 of FIG. 13 is described with respect to FIG. 14. FIG. 14 is a block diagram of a failure analyzer 1400, according to an example embodiment. Failure analyzer 1400 is a further embodiment of failure analyzer 506 of FIG. 5 and includes a failure limiter 1402, a terminate instruction generator 1404, and a recovery instruction generator 1406. Flowchart 1300 and failure analyzer 1400 are described as follows. Note that the steps of flowchart 1300 may be performed in an order different than shown in FIG. 13 in some embodiments. Furthermore, not all steps of flowchart 1300 need to be performed in all embodiments. Further structural and operational embodiments will be apparent to persons skilled in the relevant art(s) based on the following description.

Flowchart 1300 begins with step 1302. In step 1302, an indication that an interface has failed is received. For instance, failure limiter 1402 receives heartbeat error signal 520 indicative that interface 110 has failed from heartbeat monitor 508 of FIG. 5. In accordance with an embodiment, failure limiter 1402 generates and stores a count increment 1414 in memory device(s) 154. In accordance with an embodiment, count increment 1414 increments a counter of failure limiter 1402, In step 1304, a determination if the interface has failed more than a predetermined number of times is made. For instance, failure limiter 1402 determines if interface 110 has failed more than a predetermined number of times. Failure limiter 1402 may perform step 1304 in various ways. For example, as shown in FIG. 14, failure limiter 1402 receives failure history 1416 including a count of previous failures of interface 110 (e.g., the count incremented by count increment 1414). Failure limiter 1402 in accordance with an embodiment determines if the interface has failed more than the predetermined number of times based on heartbeat error signal 520 and failure history 1416. The predetermined number of times may be set by a user or developer associated with application 112 executing on cluster 106. If the interface has not failed more than the predetermined number of times, failure limiter 1402 generates recovery signal 1408 and flowchart 1300 proceeds to step 1306. If the interface has failed more than the predetermined number of times, failure limiter 1302 generates failure signal 1412 and flowchart 1300 proceeds to step 1308.

In step 1306, recovery instructions are generated. For instance, recovery instruction generator 1406 generates recovery instructions 522 in response to recovery signal 1408 and flowchart 1300 proceeds to step 1310. Recovery instructions 522 may include instructions to launch a recovered interface with the same application ID as the failed interface.

In step 1308, an indication that the interface has failed more than the predetermined number of times is generated. For instance, error signal generator 1404 generates error signal 152 based on failure signal 1412. Error signal 152 may indicate a failed interface via a flag, an error code, an error message, and/or the like. Error signal 152 may include information such as a previous state store of interface 110, a state of application 112, a time of failure, progress of a job performed by application 112, and/or other information associated with interface 110, as described elsewhere herein.

Flowchart 1300 ends with step 1310. In step 1310, a transmission is made to either a node of cluster 106 or central job service component 104 of FIG. 1. For example, if step 1306 is performed, failure analyzer 1400 performs step 1310 by transmitting recovery instructions 522 to interface launcher 504 of FIG. 5. Interface launcher 504 launches a recovered interface on cluster 106 based on recovery instructions 522. In an illustrative embodiment, the recovered interface has the same application ID as the failed interface and a different attempt ID. In this context, a new endpoint value is generated for central job service component 104 to communicate with the recovered interface. In accordance with an embodiment, the recovered interface recovers a previous state of the failed interface from memory device(s) 154 of FIG. 1 using the application ID.

If step 1308 is performed, failure analyzer 1400 performs step 1310 by transmitting error signal 152 to terminate instruction generator 1112 of FIG. 1. Terminate instruction generator 1112 is configured to generate instructions for terminating applications associated with the failed interface, as described above with respect to FIG. 11.

Thus, an example of a failure analysis operation and an associated failure analyzer have been described with respect to FIGS. 13 and 14. While failure limiter 1402 has been described as limiting recovery attempts based on a count of failures, it is contemplated herein that recovery attempts may be limited based on other factors as well. For instance, recovery attempts may be limited based on resource availability of cluster 106, a number of jobs assigned to the failed interface, a number of jobs in a queue of central job service component 104, and/or other factors for limiting recovery attempts, as described elsewhere herein or as would be understood by a person of skill in the relevant art(s) having benefit of this disclosure. Moreover, it is contemplated herein that some embodiments of failure analyzers may not include a failure limiter. In this case, the failure analyzer may attempt to recover each failed interface or terminate each failed interface. In accordance with an embodiment, a failure analyzer without a failure limiter attempts to recover a failed interface until receiving a terminate instruction external to failure analyzer 1400. For instance, the failure analyzer may attempt to recover a failed interface until a user submits terminate instructions via gateway 102.

IV. Further Example Embodiments and Advantages

As noted above, systems and devices, including central job service components, compute clusters, resource managers, interfaces, and application drivers, may be configured in various ways for on-demand launching of an interface associated with an application to be executed on a compute cluster. For instance, embodiments may launch a workload specific service or stack in a multi-tenant compute cluster with multiple workload types. Embodiments of central job service components enable flexible launching of interfaces as applications on a compute cluster. Such embodiments may reduce inefficient resource usage by enabling scaling to workload traffic. For example, a central job service component in accordance with an embodiment may pause, reduce resources allocated to, and/or terminate an interface and/or associated applications when not in use.

Embodiments of compute clusters have been described herein with application drivers operating in the application master for an associated application. For instance, as shown in FIG. 4, driver 420 includes the application driver for application 406. However, it is contemplated herein that an application driver may be operated in a "client mode" where the application driver is part of an interface (e.g., interface application master 410 of FIG. 4).

As described elsewhere herein, nodes of compute clusters such as cluster 106 of FIG. 1 may be computing devices, in accordance with an embodiment. In this context, various components and/or subcomponents of nodes described herein may be implemented as firmware, hardware, and/or services. For instance, job instruction receiver 706 and interface transmitter 710 of FIG. 7 may be implemented as a communication interface of interface node 700. This communication interface may include any type or number of wired and/or wireless communication or network adapters, modems, etc., configured to enable interface node 700 to communicate intra-system with components thereof, as well as with other devices and/or systems over a communication link and/or a network. For example, the communication interface may be used to receive launch signal 128 and/or application state signal 146 from resource manager 108 of FIG. 1, receive job instructions 132 from central job service component 104, transmit application launch instructions 134 and/or heartbeat signal 150 to resource manager 108, transmit application job instructions 136 to driver 420 of FIG. 4, and/or transmit endpoint value 130 and/or application state signal 146 to central job service component 104. The communication interface may include hardware and/or software and may support any type of input devices, sensors, receivers, transmitters, transceivers, instruments, and/or the like that may be used for wired and/or wireless communications, as described elsewhere herein and/or as would be apparent to a person of skill in the relevant art(s) having the benefit of this disclosure. Furthermore, other nodes (e.g., resource manager 108, node 116, node 118, and nodes 120 of FIG. 1, resource manager 402, application master and driver node 414, and application nodes 416A-416N of FIG. 4, and resource manager 500 of FIG. 5) of compute clusters and central job service components (e.g., central job service component 104 of FIG. 1 and central job service component 200 of FIG. 2) may include similar communication interfaces.

Moreover, according to the described embodiments and techniques, any components of systems, central job service components, resource managers, interfaces, application drivers, and/or node managers and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The further example embodiments and advantages described in this Section may be applicable to any embodiments disclosed in this Section or in any other Section of this disclosure.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

V. Example Computer System Implementations

Gateway 102, central job service component 104, cluster 106, resource manager 108, interface 110, application 112, data pool 114, node 116, node 118, node(s) 120, memory device(s) 154, central job service component 200, job request receiver 202, job request analyzer 204, service instruction transmitter 206, interface monitor 208, memory client 210, memory device(s) 212, flowchart 300, flowchart 320, cluster 400, resource manager 402, interface node 404, application 406, node manager 410, interface application master 412, application master and driver node 414, application nodes 416A-416N, node manager 418, driver 420, node managers 422A-422N, executors 424A-424N, resource manager 500, launch instruction receiver 502, interface launcher 504, failure analyzer 506, heartbeat monitor 508, application launcher 510, application state monitor 512, container allocator 514, terminate manager 516, flowchart 600, flowchart 620, flowchart 640, interface node 700, node manager 702, interface application master 704, job instruction receiver 706, application instruction generator 708, interface transmitter 710, state monitor 712, endpoint generator 714, application master 716, heartbeat generator 718, flowchart 800, state monitor 900, application state receiver 902, application state requester 904, resource analyzer 906, state store generator 908, state reporter 910, flowchart 1000, interface monitor 1100, state receiver 1104, endpoint receiver 1106, additional interface determiner 1108, auto-pause timer 1110, terminate instruction generator 1112, flowchart 1200, flowchart 1250, flowchart 1300, failure analyzer 1400, failure limiter 1402, error signal generator 1404, and/or recovery instruction generator 1406 may be implemented in hardware, or hardware with any combination of software and/or firmware, including being implemented as computer program code configured to be executed in one or more processors and stored in a computer readable storage medium, or being implemented as hardware logic/ electrical circuitry, such as being implemented in a system-on-chip (SoC). The SoC may include an integrated circuit chip that includes one or more of a processor (e.g., a microcontroller, microprocessor, or digital signal processor (DSP)), memory, one or more communication interfaces, and/or further circuits and/or embedded firmware to perform its functions.

Figure 15:
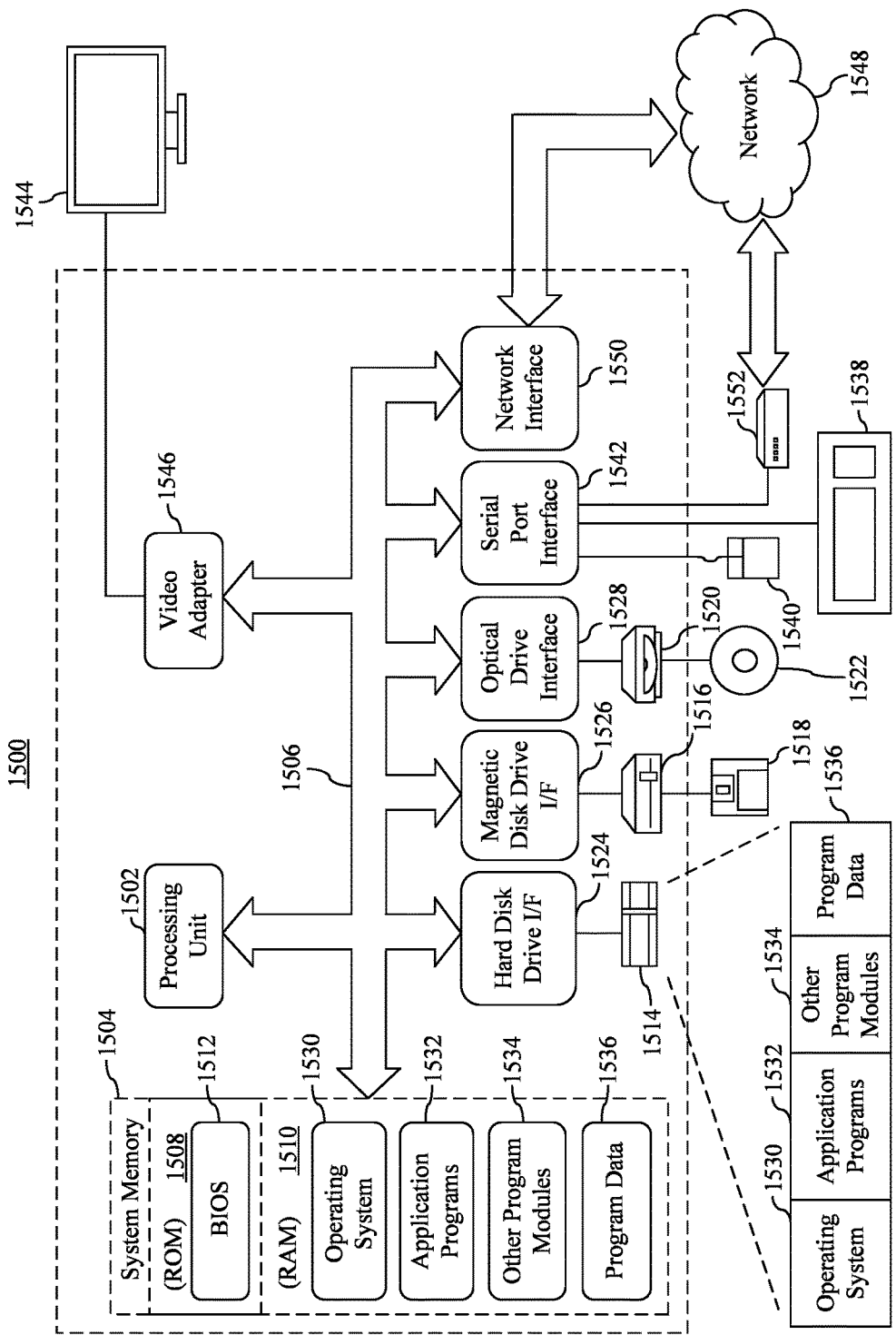
FIG. 15 is a block diagram of an example computer system that may be used to implement embodiments.

FIG. 15 depicts an exemplary implementation of a processor-based computer system 1500 ("system 1500" herein) in which embodiments may be implemented. For example, system 1500 may be used to implement gateway 102, central job service component 104, resource manager 108, interface 110, application 112, node 116, node 118, and/or node(s) 120, as described above in reference to FIG. 1. System 1500 may also be used to implement central job service component 200, as described above in reference to FIG. 2. System 1500 may also be used to implement resource manager 402, interface node 404, application master and driver node 414, and/or application nodes 416A-416N, as described above in reference to FIG. 4. System 1500 may also be used to implement resource manager 500, as described above in reference to FIG. 5. System 1500 may also be used to implement interface node 700, as described above in reference to FIG. 7. System 1500 may also be used to implement state monitor 900, as described above in reference to FIG. 9. System 1500 may also be used to implement interface monitor 1100, as described above in reference to FIG. 11. System 1500 may also be used to implement failure analyzer 1400, as described above in reference to FIG. 14. System 1500 may also be used to implement any of the steps of any of the flowcharts of FIGS. 3A, 3B, 6A-6C, 8, 10, 12A, 12B, and 13, as described above. The description of system 1500 provided herein is provided for purposes of illustration, and is not intended to be limiting. Embodiments may be implemented in further types of computer systems, as would be known to persons skilled in the relevant art(s).

As shown in FIG. 15, system 1500 includes one or more processors, referred to as processing unit 1502, a system memory 1504, and a bus 1506 that couples various system components including system memory 1504 to processing unit 1502. Processing unit 1502 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processing unit 1502 may execute program code stored in a computer readable medium, such as program code of operating system 1530, application programs 1532, other programs 1534, etc. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

System 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards and drives (e.g., solid state drives (SSDs)), digital video disks, RAMs, ROMs, and other hardware storage media.

A number of program modules or components may be stored on the hard disk, magnetic disk, optical disk, ROM, or RAM. These program modules include an operating system 1530, one or more application programs 1532, other program modules 1534, and program data 1536. In accordance with various embodiments, the program modules may include computer program logic that is executable by processing unit 1502 to perform any or all the functions and features of gateway 102, central job service component 104, resource manager 108, interface 110, application 112, central job service component 200, job request receiver 202, job request analyzer 204, service instruction transmitter 206, interface monitor 208, memory client 210, flowchart 300, flowchart 320, cluster 400, resource manager 402, application 406, node manager 410, interface application master 412, node manager 418, driver 420, node managers 422A-422N, executors 424A-424N, resource manager 500, launch instruction receiver 502, interface launcher 504, failure analyzer 506, heartbeat monitor 508, application launcher 510, application interface 512, container allocator 514, recovery manager 516, flowchart 600, flowchart 620, flowchart 640, node manager 702, interface application master 704, job instruction receiver 706, application instruction generator 708, interface transmitter 710, state monitor 712, endpoint generator 714, application master 716, heartbeat generator 718, flowchart 800, state monitor 900, application state receiver 902, application state requester 904, resource analyzer 906, state store generator 908, state reporter 910, flowchart 1000, interface monitor 1100, state store receiver 1104, endpoint receiver 1106, additional interface determiner 1108, auto-pause timer 1110, terminate instructions generator 1112, flowchart 1200, flowchart 1250, flowchart 1300, failure analyzer 1400, failure limiter 1402, error signal generator 1404, and/or recovery instruction generator 1406.

A user may enter commands and information into the system 1500 through input devices such as keyboard 1538 and pointing device 1540. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processing unit 1502 through a serial port interface 1542 that is coupled to bus 1506, but may be connected by other interfaces, such as a parallel port, game port, or a universal serial bus (USB).

A display screen 1544 is also connected to bus 1506 via an interface, such as a video adapter 1546. Display screen 1544 may be external to, or incorporated in, system 1500. Display screen 1544 may display information, as well as being a user interface for receiving user commands and/or other information (e.g., by touch, finger gestures, virtual and/or keyboard). For example, display screen 1544 may display dashboard 1400, 1500, and/or 1600. In addition to display screen 1544, system 1500 may include other peripheral output devices (not shown) such as speakers and printers.

System 1500 is connected to a network 1448 (e.g., the Internet) through an adaptor or network interface 1550, a modem 1552, or other means for establishing communications over the network. Modem 1552, which may be internal or external, may be connected to bus 1506 via serial port interface 1542, as shown in FIG. 15, or may be connected to bus 1506 using another interface type, including a parallel interface.

As used herein, the terms "computer program medium," "computer-readable medium," and "computer-readable storage medium" are used to refer to physical hardware media such as the hard disk associated with hard disk drive 1514, removable magnetic disk 1518, removable optical disk 1522, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (i.e., do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1532 and other programs 1534) may be stored on the hard disk, magnetic disk, optical disk, ROM, RAM, or other hardware storage medium. Such computer programs may also be received via network interface 1550, serial port interface 1542, or any other interface type. Such computer programs, when executed or loaded by an application, enable system 1500 to implement features of embodiments described herein. Accordingly, such computer programs represent controllers of the system 1500.

Embodiments are also directed to computer program products comprising computer code or instructions stored on any computer-readable medium. Such computer program products include hard disk drives, optical disk drives, memory device packages, portable memory sticks, memory cards, and other types of physical storage hardware. In accordance with various embodiments, the program modules may include computer program logic that is executable by processing unit 1502 to perform any or all of the functions and features of gateway 102, central job service component 104, resource manager 108, interface 110, and/or application 112, as described above in reference to FIG. 1, central job service component 200, job request receiver 202, job request analyzer 204, service instruction transmitter 206, interface monitor 208, and/or memory client 210, as described above in reference to FIG. 2, cluster 400, resource manager 402, application 406, node manager 410, interface application master 412, node manager 418, driver 420, node managers 422A-422N, and/or executors 424A-424N, as described above in reference to FIG. 4, resource manager 500, launch instruction receiver 502, interface launcher 504, failure analyzer 506, heartbeat monitor 508, application launcher 510, application interface 512, container allocator 514, and/or terminate manager 516, as described above in reference to FIG. 5, node manager 702, interface application master 704, job instruction receiver 706, application instruction generator 708, interface transmitter 710, state monitor 712, endpoint generator 714, application master 716, and/or heartbeat generator 718, as described above in reference to FIG. 7, state monitor 900, application state receiver 902, application state requester 904, resource analyzer 906, state store generator 908, and/or state reporter 910, as described above in reference to FIG. 9, interface monitor 1100, state store receiver 1104, endpoint receiver 1106, additional interface determiner 1108, auto-pause timer 1110 and/or terminate instruction generator 1112, as described above in reference to FIG. 11, and/or failure analyzer 1400, failure limiter 1402, error signal generator 1404, and/or recovery instruction generator 1406, as described above in reference to FIG. 14. The program modules may also include computer program logic that, when executed by processing unit 1502, causes processing unit 1502 to perform any of the steps of any of the flowcharts of FIGS. 3A, 3B, 6A-6C, 8, 10, 12A, 12B, and 13, as described above.

VI. Additional Exemplary Embodiments

In an embodiment, a system is configured for on-demand launching of an interface associated with an application to be executed on a compute cluster. The interface enables a user to interact with the application while the application is executing on the compute cluster. The system includes at least one processor circuit and at least one memory that stores program code configured to be executed by the at least one processor circuit. The program code includes a central job service component configured to receive a job request associated with the application. Responsive to receiving the job request, the central job service component determines if the interface has already been launched on the compute cluster responsive to an earlier-received job request. In response to determining that the interface has not already been launched on the compute cluster, the central job service component transmits launch instructions to the compute cluster to cause the interface to be launched on the compute cluster. The central job service component is configured to transmit job instructions to the compute cluster to cause the application to be executed on the compute cluster.

In an embodiment, the central job service component is configured to determine if the interface has already been launched on the compute cluster by determining if the interface has already been launched on the compute cluster for one of: a user identifier (ID) associated with the job request; a customer ID associated with the job request; or a workload queue ID associated with the job request.

In an embodiment, the launch instructions further cause the compute cluster to terminate the interface if a subsequent job request associated with the interface or the application is not received within a predetermined time.

In an embodiment, the job request includes a code statement. The central job service component is further configured to generate the job instructions based on the job request, the job instructions including the code statement.

The central job service component is further configured to transmit the job instructions to the compute cluster to cause the interface to determine a job to be performed by the application based on the code statement.

In an embodiment, the central job service component is further configured to obtain a metric indicative of an operational state of the interface. Based at least on the metric, the central job service component transmits additional launch instructions to the compute cluster to cause an additional interface to launch on the compute cluster.

In an embodiment, the central job service component is further configured to obtain an endpoint value for the interface from the compute cluster and transmit the job instructions to the interface using the endpoint value.

In an embodiment, the central job service component is further configured to receive from the compute cluster an indication that the interface has failed more than a predetermined number of times. In response to at least on the indication that the interface has failed more than the predetermined number of times, the central job service component is configured to transmit terminate instructions to the compute cluster to cause one or more applications associated with the interface to be terminated.

In an embodiment, the interface is an interface application master including an application master resource manager client configured to extend an entry point of the interface. The central job service is configured to transmit the job instructions to the interface via the entry point.

In an embodiment, a method for on-demand launching of an interface associated with an application to be executed on a compute cluster is performed. The interface enables a user to interact with the application while the application is executing on the compute cluster. The method includes receiving a job request associated with the application. Responsive to receiving the job request, a determination on whether the interface has already been launched on the compute cluster responsive to an earlier-received job request is made. In response to determining that the interface has not already been launched on the compute cluster, launch instructions are transmitted to the compute cluster to cause the interface to be launched on the compute cluster. Job instructions are transmitted to the compute cluster to cause the application to be executed on the compute cluster.

In an embodiment, said determining if the interface has already been launched on the compute cluster includes determining if the interface has already been launched on the compute cluster for one of: a user identifier (ID) associated with the job request; a customer ID associated with the job request; or a workload queue ID associated with the job request.

In an embodiment, the launch instructions further cause the compute cluster to terminate the interface if a subsequent job request associated with the interface or the application is not received within a predetermined time.

In an embodiment, the job request includes a code statement. The method further includes generating the job instructions based on the job request, the job instructions including the code statement. Transmitting the job instructions to the compute cluster causes the interface to determine a job to be performed by the application based on the code statement.

In an embodiment, the method further includes obtaining an endpoint value for the interface from the computer cluster. The job instructions are transmitted to the interface using the endpoint value.

In an embodiment, the method further includes obtaining a metric indicative of an operational state of the interface. Based at least on the metric, additional launch instructions are transmitted to the compute cluster to cause an additional interface to launch on the compute cluster.

In an embodiment, the method further includes receiving from the compute cluster an indication that the interface has failed more than a predetermined number of times. In response to at least on the indication that the interface has failed more than the predetermined number of times, terminate instructions are transmitted to the compute cluster to cause one or more applications associated with the interface to be terminated.

In an embodiment, the interface is an interface application master including an application master resource manager client configured to extend an entry point of the interface. Transmitting the job instructions to the compute cluster includes transmitting the job instructions to the interface via the entry point.

In an embodiment, a computer-readable storage medium has programming instructions encoded thereon. The programming instructions are executable by one or more processors to perform a method for on-demand launching of an interface associated with an application to be executed on a compute cluster. The interface enables a user to interact with the application while the application is executing on the compute cluster. The method includes receiving a job request associated with the application. Responsive to receiving the job request, a determination on whether the interface has already been launched on the compute cluster responsive to an earlier-received job request is made. In response to determining that the interface has not already been launched on the compute cluster, launch instructions are transmitted to the compute cluster to cause the interface to be launched on the compute cluster. Job instructions are transmitted to the compute cluster to cause the application to be executed on the compute cluster.

In an embodiment, said determining if the interface has already been launched on the compute cluster includes determining if the interface has already been launched on the compute cluster for one of: a user identifier (ID) associated with the job request; a customer ID associated with the job request; or a workload queue ID associated with the job request.

In an embodiment, the job request includes a code statement. The method further includes generating the job instructions based on the job request, the job instructions including the code statement. Transmitting the job instructions to the compute cluster causes the interface to determine a job to be performed by the application based on the code statement.

In an embodiment, the method further includes receiving from the compute cluster an indication that the interface has failed more than a predetermined number of times. In response to at least receiving the indication that the interface has failed, terminate instructions are transmitted to the compute cluster to cause one or more applications associated with the interface to be terminated.

VII. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system configured for on-demand launching of an interface associated with an application to be executed on a compute cluster, the interface enabling a user to interact with the application while the application is executing on the compute cluster, the system comprising:
a processor circuit;
a memory that stores program code configured to be executed by the processor circuit, the program code comprising:
a central job service component configured to:
receive a job request associated with the application;
responsive to receiving the job request:
determine the interface has not already been launched on the compute cluster responsive to an earlier-received job request, and
transmit launch instructions to a resource manager of the compute cluster to cause the interface to be launched on a first node of the compute cluster; and
transmit job instructions to the interface to cause the application to be launched on a second node of the compute cluster.

2. The system of claim 1, wherein to determine the interface has not already been launched on the compute cluster, the central job service component is further configured to determine if the interface has already been launched on the compute cluster for at least one of:
a user identifier (ID) associated with the job request;
a customer ID associated with the job request; or
a workload queue ID associated with the job request.

3. The system of claim 1, wherein the launch instructions further cause the compute cluster to terminate the interface if a subsequent job request associated with the interface or the application is not received within a predetermined time.

4. The system of claim 1, wherein:
the job request includes a code statement; and
the central job service component is further configured to:
generate the job instructions based on the job request, the job instructions including the code statement; and
transmit the job instructions to the compute cluster to cause the interface to determine a job to be performed by the application based on the code statement.

5. The system of claim 1, wherein the central job service component is further configured to:
obtain a metric indicative of an operational state of the interface; and
based on the metric, transmit additional launch instructions to the compute cluster to cause an additional interface to launch on the compute cluster.

6. The system of claim 1, wherein the central job service component is further configured to:
obtain an endpoint value for the interface from the compute cluster; and
transmit the job instructions to the interface using the endpoint value.

7. The system of claim 1, wherein, in response to an indication that the interface has failed more than a predetermined number of times, the central job service component is further configured to transmit terminate instructions to the compute cluster to cause the application to be terminated.

8. The system of claim 1, wherein the interface is an interface application master including an application master resource manager client configured to extend an entry point of the interface, and wherein the central job service component is configured to transmit the job instructions to the interface via the entry point.

9. A method for on-demand launching of an interface associated with an application to be executed on a compute cluster, the interface enabling a user to interact with the application while the application is executing on the compute cluster, the method comprising:
by a central job service component executing on a computing device:
receiving a job request associated with the application;
responsive to receiving the job request:
determining the interface has not already been launched on the compute cluster responsive to an earlier-received job request, and
transmitting launch instructions to a resource manager of the compute cluster to cause the interface to be launched on a first node of the compute cluster; and
transmitting job instructions to the interface to cause the application to be launched on a second node of the compute cluster.

10. The method of claim 9, wherein said determining the interface has not already been launched on the compute cluster comprises:
determining if the interface has already been launched on the compute cluster for one of:
a user identifier (ID) associated with the job request;
a customer ID associated with the job request; or
a workload queue ID associated with the job request.

11. The method of claim 9, wherein the launch instructions further cause the compute cluster to terminate the interface if a subsequent job request associated with the interface or the application is not received within a predetermined time.

12. The method of claim 9, wherein:
the job request includes a code statement;
the method further comprises generating the job instructions based on the job request, the job instructions including the code statement; and
said transmitting the job instructions to the interface causes the interface to determine a job to be performed by the application based on the code statement.

13. The method of claim 9, further comprising:
obtaining an endpoint value for the interface from the computer cluster; and
transmitting the job instructions to the interface using the endpoint value.

14. The method of claim 9, further comprising:
obtaining a metric indicative of an operational state of the interface; and
based on the metric, transmitting additional launch instructions to the compute cluster to cause an additional interface to launch on the compute cluster.

15. The method of claim 9, further comprising:
in response to an indication that the interface has failed more than a predetermined number of times, transmitting terminate instructions to the compute cluster to cause the application to be terminated.

16. The method of claim 9, wherein the interface is an interface application master including an application master resource manager client configured to extend an entry point of the interface, and wherein said transmitting the job instructions to the interface includes transmitting the job instructions to the interface via the entry point.

17. A computer-readable storage medium having programming instructions encoded thereon that are executable by a processor circuit to perform a method for on-demand launching of an interface associated with an application to be executed on a compute cluster, the interface enabling a user to interact with the application while the application is executing on the compute cluster, the method comprising:
   by a central job service component executing on a computing device:
      receiving a job request associated with the application;
      responsive to receiving the job request:
         determining the interface has not already been launched on the compute cluster responsive to an earlier-received job request, and
         transmitting launch instructions to a resource manager of the compute cluster to cause the interface to be launched on a first node of the compute cluster; and
      transmitting job instructions to the interface to cause the application to be launched on a second node of the compute cluster.

18. The computer-readable storage medium of claim 17, wherein said determining the interface has not already been launched on the compute cluster comprises:
   determining if the interface has already been launched on the compute cluster for one of:
      a user identifier (ID) associated with the job request;
      a customer ID associated with the job request; or
      a workload queue ID associated with the job request.

19. The computer-readable storage medium of claim 17, wherein:
   the job request includes a code statement;
   the method further comprises generating the job instructions based on the job request, the job instructions including the code statement; and
   said transmitting the job instructions to the interface causes the interface to determine a job to be performed by the application based on the code statement.

20. The computer-readable storage medium of claim 17, the method further comprising:
   in response to receiving an indication that the interface has failed more than a predetermined number of times, transmitting terminate instructions to the compute cluster to cause the application to be terminated.

* * * * *